US009606745B2

United States Patent
Satoyama et al.

(10) Patent No.: US 9,606,745 B2
(45) Date of Patent: *Mar. 28, 2017

(54) STORAGE SYSTEM AND METHOD FOR ALLOCATING RESOURCE

(71) Applicant: HITACHI, LTD., Tokyo (JP)

(72) Inventors: Ai Satoyama, Sagamihara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/142,259

(22) Filed: Apr. 29, 2016

(65) Prior Publication Data

US 2016/0239238 A1    Aug. 18, 2016

Related U.S. Application Data

(63) Continuation of application No. 13/795,183, filed on Mar. 12, 2013, now Pat. No. 9,396,029, which is a
(Continued)

(51) Int. Cl.
*G06F 12/00* (2006.01)
*G06F 3/06* (2006.01)
(Continued)

(52) U.S. Cl.
CPC ............ *G06F 3/0644* (2013.01); *G06F 3/061* (2013.01); *G06F 3/064* (2013.01); *G06F 3/0607* (2013.01);
(Continued)

(58) Field of Classification Search
None
See application file for complete search history.

(56) References Cited

U.S. PATENT DOCUMENTS 7,606,868 B1    10/2009  Le et al.
7,774,391 B1     8/2010  Le et al.
(Continued)

FOREIGN PATENT DOCUMENTS

GB    2407431 B     9/2005
JP    2005-128733   5/2005
JP    2005-535961  11/2005

OTHER PUBLICATIONS

Translation of the Japanese Allowance received in corresponding Japanese Application No. 2015-523724 dated Dec. 22, 2015.
(Continued)

*Primary Examiner* — Yong Choe
*Assistant Examiner* — Eric Loonan
(74) *Attorney, Agent, or Firm* — Mattingly & Malur, PC

(57) ABSTRACT

In conventional unified storage systems, an I/O for block storage and an I/O for file storage are processed in a single OS without being distinguished, so that it was not possible to perform processes for speedy failure detection or for enhancing performances such as tuning of performance by directly monitoring hardware. The present invention solves the problem by having a block storage-side OS and an OS group managing multiple systems including a file system other than the block storage-side OS coexist within a storage system, wherein the OS group managing multiple systems including a file system other than the block storage-side OS is virtualized by a hypervisor, wherein a block storage micro-controller and the hypervisor can cooperate in performing processes.

18 Claims, 26 Drawing Sheets

Related U.S. Application Data continuation of application No. PCT/JP2013/000430, filed on Jan. 28, 2013.

(51) Int. Cl.
    *G06F 9/50*     (2006.01)
    *G06F 9/455*     (2006.01)
    *G06F 11/07*     (2006.01)

(52) U.S. Cl.
    CPC .......... *G06F 3/0631* (2013.01); *G06F 3/0659* (2013.01); *G06F 3/0664* (2013.01); *G06F 3/0689* (2013.01); *G06F 9/45558* (2013.01); *G06F 9/5016* (2013.01); *G06F 11/0727* (2013.01); *G06F 11/0751* (2013.01); *G06F 11/0772* (2013.01); *G06F 2009/45579* (2013.01)

(56) References Cited

U.S. PATENT DOCUMENTS

| | | | |
|---|---|---|---|
| 8,060,685 B2 * | 11/2011 | Scott | G06F 3/0607 711/100 |
| 8,095,525 B2 | 1/2012 | Le et al. | |
| 8,127,292 B1 * | 2/2012 | Dobrovolskiy | G06F 9/45541 717/174 |
| 8,307,359 B1 | 11/2012 | Brown et al. | |
| 8,671,414 B1 | 3/2014 | Loafman et al. | |
| 8,683,548 B1 | 3/2014 | Curry et al. | |
| 8,726,337 B1 | 5/2014 | Curry et al. | |
| 2003/0023784 A1 * | 1/2003 | Matsunami | G06F 3/0607 710/36 |
| 2003/0236852 A1 * | 12/2003 | Fernandes | H04L 29/12009 709/215 |
| 2005/0091453 A1 | 4/2005 | Shimada et al. | |
| 2005/0091454 A1 * | 4/2005 | Shimada | G06F 3/0605 711/114 |
| 2006/0149899 A1 | 7/2006 | Zimmer et al. | |
| 2008/0104315 A1 | 5/2008 | Hall | |
| 2010/0058335 A1 * | 3/2010 | Weber | G06F 9/45533 718/1 |
| 2010/0100718 A1 * | 4/2010 | Srinivasan | G06F 9/5077 713/1 |
| 2011/0072208 A1 * | 3/2011 | Gulati | G06F 3/0613 711/114 |

OTHER PUBLICATIONS

Japanese Office Action received in corresponding Japanese Application No. 2015-523724 dated Nov. 4, 2015.

* cited by examiner 3211A,3221A : FOS
3212,3222 : Search System
3213,3223 : Hypervisor
3214A,3214B,3224A,3224B : Block Storage Micro-Controller

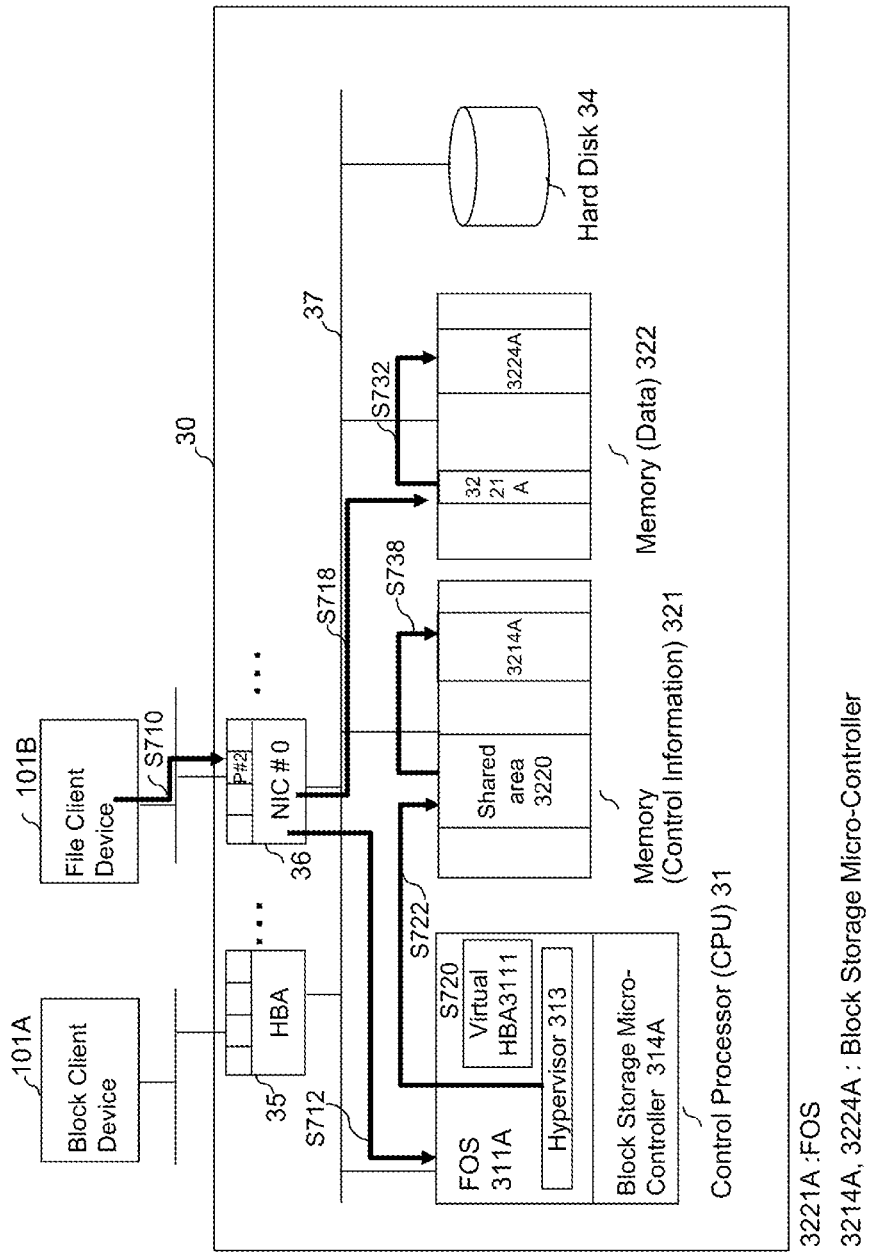

| Resource Name | Resource Details | Defined/Undefined in block storage side |
|---|---|---|
| CPU1 | Core1 | Defined |
| | Core2 | Defined |
| | Core3 | Defined |
| | Core4 | Defined |
| CPU2 | ... | Defined |
| CPU3 | ... | Undefined |

(802A, 803A, 804A)

| Resource Name | Address | Defined/Undefined in Block Storage Side |
|---|---|---|
| Memory DMM1 | 0 ~ 1000 | Defined |
| | 1001 ~ 2000 | Defined |
| | 2001 ~ | Undefined |
| Memory DMM2 | 0 ~ 2000 | Undefined |
| | 2001 ~ 3000 | Undefined |
| | 3001 ~ | Undefined |

(812A, 813A, 814A)

| Resource Name | Defined/Undefined in Block Storage Side |
|---|---|
| HDD1 | Defined |
| HDD2 | Defined |

(815A, 816A)

| Resource Name | Defined/Undefined in Block Storage Side |
|---|---|
| FC Port 1 | Defined |
| Ether Port 1 | Defined |

(817A, 818A)

| Resource Name | Status of Use |
|---|---|
| CPU1 | During use |
| CPU2 | During use |

(822A, 823A, 821A)

| Resource Name | Address | Status of Use |
|---|---|---|
| CPU1 | 0 ~ 1000 | During use |
| CPU2 | 1001 ~ 2000 | During use |

| Resource Name | Status of Use |
|---|---|
| CPU3 | During use |
| CPU4 | During use |

801B, 802B, 803B

| Resource Name | Address | Status of Use | User |
|---|---|---|---|
| Memory | 1001 ~ 2000 | During use | Used by hypervisor (itself) |
| | 2001 ~ 3000 | During use | Used by hypervisor (itself) |
| | 3001 ~ 4000 | During use | FOS |
| | 4001 ~ 5000 | During use | Search System(OS) |
| | ... | During use | Other OS |

811B, 812B, 813B, 814B, 815B

| Resource Name | Virtual Resource Name | User |
|---|---|---|
| CPU3 | VCPU1 | FOS |
| | VCPU2 | Search System(OS) |
| | VCPU3 | FOS |
| | VCPU4 | FOS |
| CPU4 | | |

| Resource Name |
|---|
| CPU3 |

802C

| Resource Name | Address | Status of Use |
|---|---|---|
| Memory | 1001 ~ 2000 | During use |
| | 2001 ~ 3000 | During use |

| File Name or Directory Information | Corresponding LU Information |
|---|---|
| File200 (/home/fos/file0) | LU # 0 |
| File201 (/home/fos/file1) | LU # 1 |
| ... | |

902 / 903 / 901

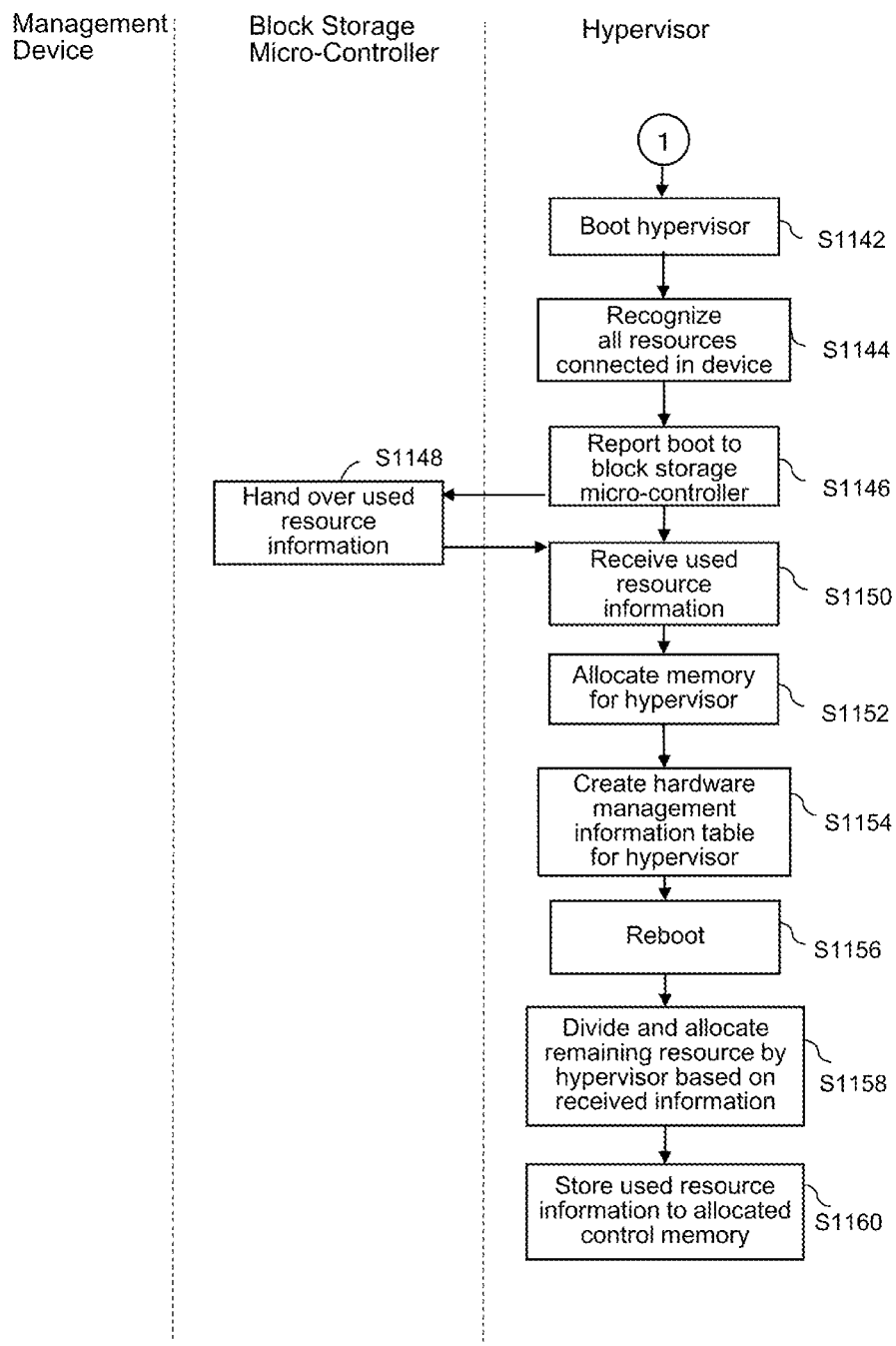

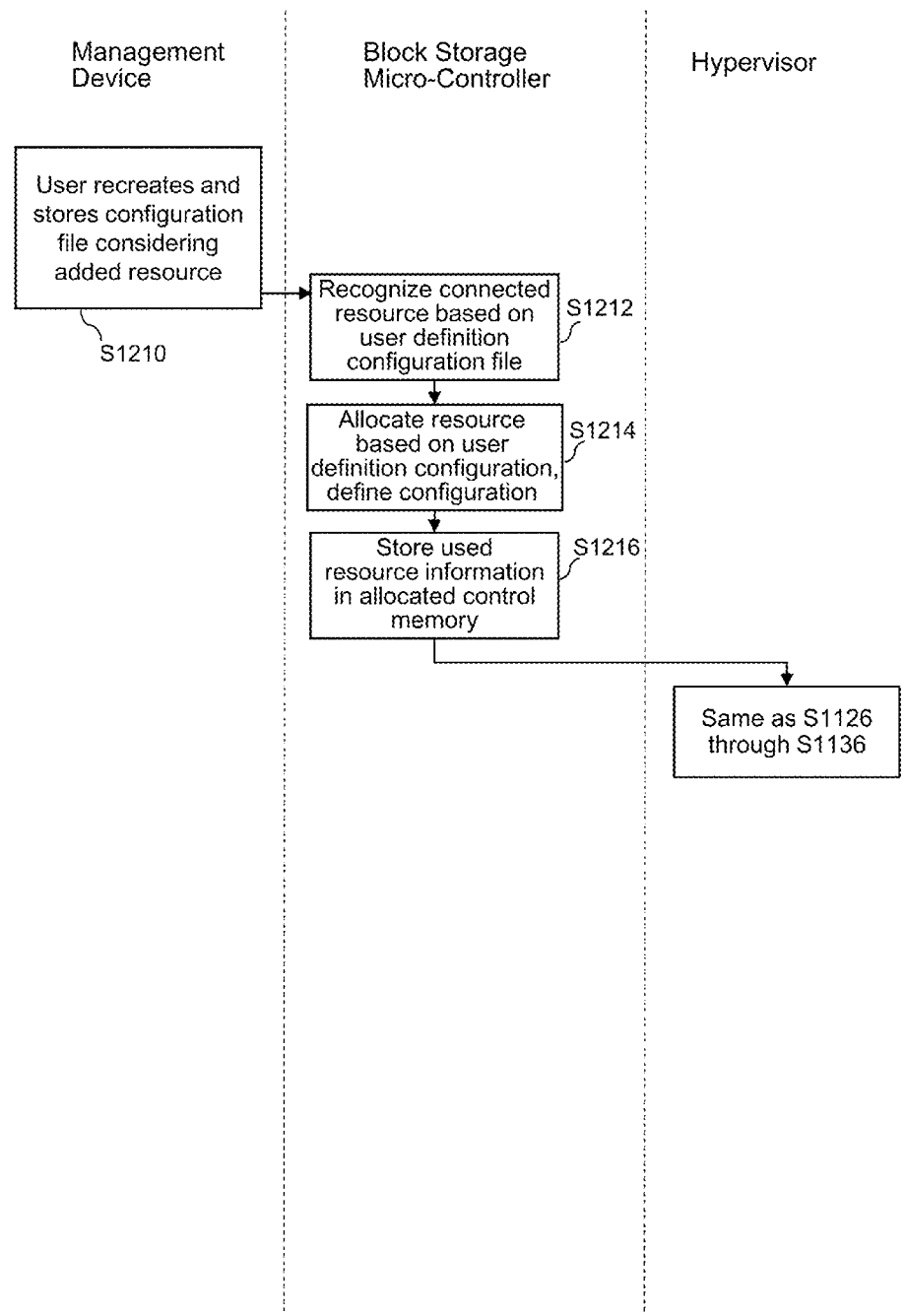

Fig.23

| Resource Name | Status | User |
|---|---|---|
| CPU1 | Normal | Block |
| CPU2 | During use | Block |
| CPU3 | During use | FOS |
| CPU4 | During use | Search System (OS) |

| Resource Name | Status | Address | User |
|---|---|---|---|
| Memory | Normal | 0 ~ 1000 | Block |
| | | 1001 ~ 2000 | Shared |
| | | 2001 ~ 3000 | Hypervisor |
| | | 3001 ~ 4000 | FOS |
| | | 4001 ~ 5000 | Search System (OS) |
| | | ... | FOS |

STORAGE SYSTEM AND METHOD FOR ALLOCATING RESOURCE

CLAIM OF PRIORITY

This is a continuation of U.S. application Ser. No. 13/795,183, filed Mar. 12, 2013, now U.S. Pat. No. 9,396,029, which is a continuation of International Application PCT/JP2013/000430, with an international filing date of Jan. 28, 2013.

TECHNICAL FIELD

The present invention relates to a storage system and a method for allocating resource.

BACKGROUND ART

Computer systems providing large-scale data storage service to host computers have been provided. Such system is known to include a host computer, a storage subsystem to which the host computer connects, and a management device of the storage subsystem. The storage subsystem manages a plurality of hard disks via RAID (Redundant Array of Independent/Inexpensive Disks) configuration. The system logicalizes physical storage areas included in a plurality of hard disks, and provides them to the host computer as logical volumes. The host computer accesses the logical volumes and requests reading and writing of data.

As a recent technical trend, there are demand for downsizing the storage subsystem space, cutting down operation management costs, facilitating maintenance, and efficiently utilizing CPU and other resources. Along therewith, a unified storage system, which is an integrated storage subsystem capable of corresponding to a plurality of protocols such as FC (Fibre Channel), iSCSI, FCoE (Fibre Channel over Ethernet) and NAS (Network Attached Storage) via a single machine, is attracting attention. The merits of an integrated machine are that it enables direct connection of elements, suppresses development costs, and ensures performance.

Moreover, an art of logically dividing hardware resources included in a storage system connected to a network and receiving file accesses (such as a NAS), and independently operating the individual logical partitions (virtual storage subsystems) is known (refer to patent literature 1).

CITATION LIST

Patent Literature

[PTL 1]
Japanese Patent Application Laid-Open Publication No. 2005-128733 (US Patent Publication No. 2005/0091454)

SUMMARY OF INVENTION

Technical Problem

According to a conventional integrated storage system, I/O for block storages and I/O for file storages are not distinguished within the single operating system (OS) processing the same. Therefore, according to the prior art block storage subsystem, processes for enhancing performance cannot be performed. For example, in a block storage subsystem, the reliability of the system can be enhanced by immediately detecting failure via real-time OS, or tuning of performance can be realized by directly monitoring the operation of the hardware, but in a single OS configuration, such processes cannot be performed.

Therefore, the object of the present invention is to provide a storage system capable of taking full advantage of the high performance of the block storage subsystem, and to provide a method for allocating resources in such system.

Solution to Problem

The present invention provides a unified storage subsystem providing a service using a plurality of OSs such as an OS for block storage and an OS for file system other than the OS for block storage. In other words, the present system provides a service based on a block interface using the OS for block storage, and a system for providing a service based on a file interface using the OS for file system (such as a search system or Windows). The main aspect of the present invention for solving the problems of the prior art is that the OS for block storage, which is a real-time OS, is separated from the OS for file systems.

Further, since a plurality of OSs coexist within a single housing, the storage subsystem can have a plurality of OSs operate cooperatively.

Further, in order to realize a unified storage subsystem taking full advantage of the superior functions of a high-end storage subsystem, it is necessary to allocate CPUs and memories that the high-end storage subsystem requires for operation. Therefore, the present invention provides a method for defining (allocating) hardware resources enabling the high-end storage subsystem to exert its superior performances.

According to the present invention, a configuration is provided in which a plurality of OSs coexist. At first, the OSs are divided into a block storage micro-controller (block storage-side OS) and OS other than the block storage, wherein the OS other than the block storage is formed in a hypervisor. A hypervisor is a software capable of realizing a virtual environment for executing a plurality of different OSs in parallel.

The processes of the block storage micro-controller and the hypervisor are performed in cooperative manner.

The storage subsystem storing data constitutes a high-end storage subsystem, and the block storage micro-controller executes the processes.

Advantageous Effects of Invention

By performing hardware resource definition according to the present invention, it becomes possible to operate the system without wasting resources and without deteriorating respective process efficiencies and performances.

Since resource is allocated first to the control of the block storage micro-controller, the performance of the storage micro-controller side can be ensured. This leads to ensuring the performance of the overall system. The ability of the process and the function of the block storage micro-controller side can be utilized effectively.

BRIEF DESCRIPTION OF DRAWINGS

FIG. 7 is a view showing the outline of the process when an FOS receives I/O as an example of I/O processing other than the block storage.

FIG. 8A shows an example of a hardware resource management table, which is a hardware resource management information stored in a block storage micro-controller.

FIG. 8B shows an example of a hardware resource management table, which is a hardware resource management information stored in a hypervisor.

FIG. 8C shows an example of a hardware resource management table, which is a hardware resource management information stored in each OS other than the block storage.

FIG. 9 shows an example of a directory device information table.

FIG. 11C shows another process for allocating a hardware resource.

FIG. 12 shows a process for defining configuration when a resource is added.

FIG. 23 is a view showing an information management table storing information related to failure monitoring.

DESCRIPTION OF EMBODIMENTS

Now, the preferred embodiments of the present invention will be described with reference to the drawings. The embodiments illustrated in the present description are mere examples for implementing the present invention, and are not intended to restrict the technical scope of the present invention in any way. The common components in the respective drawings are denoted with the same reference numbers.

In the following description, various information according to the present invention are described in "table" format, but these information can be expressed via data structures other than tables, such as lists, DBs (databases) and queues. In order to indicate that the information does not depend on the data structure, the "tables", "lists", "DBs" and "queues" are sometimes simply referred to as "information". Expressions such as "identification information", "identifier", "name" and "ID" can be used for describing the contents of the respective information, and these terms are mutually replaceable.

The processes are sometimes described using the term "program" as the subject. The program is executed by a processor for performing determined processes using memories and communication ports (communication control units), so that a processor can also be used as the subject of the processes. The processes described using the program as the subject can also be set as processes performed by computers and information processing devices, such as management servers. A portion or all of the programs can be realized via a dedicated hardware, or can be formed into modules. Various programs can be installed to the respective computers via a program distribution server or storage media, for example.

Figure 1:
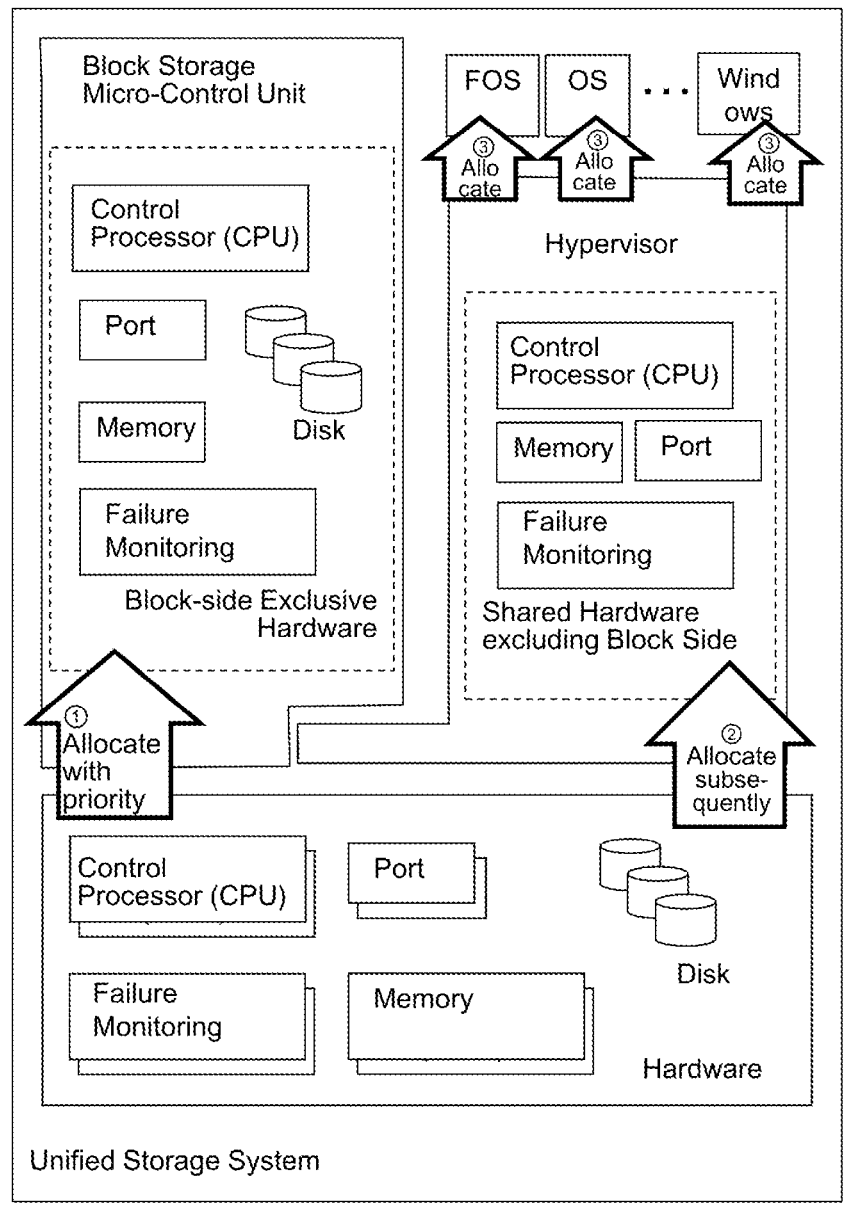
FIG. 1 is a conceptual diagram of the method for allocating hardware resources in a unified storage subsystem.

FIG. 1 illustrates a conceptual view of a unified storage system, related to a method for allocating hardware resources in a block storage micro-controller side and a control side other than the block storage micro-controller side. A plurality of OSs coexist within a unified storage system. A "portion of hardware" out of all hardware connected to the unified storage system is allocated in a "prioritized manner" to a specific OS. In the present example, the specific OS is the block storage micro-control unit. The remaining hardware that had not been allocated to the block storage micro-control unit are allocated to the OS other than the block storage micro-control unit.

In FIG. 1, there are a plurality of OSs other than the block storage micro-control unit, and as a software for virtualizing the plurality of OSs, hardware resources are distributed via a hypervisor. In the present example, an LPAR (Logical PARtitioning), which is an art of performing logical partitioning, is used to perform allocation. The hypervisor allocates the allocatable hardware resources to target OSs simultaneously.

Hardware resources include, for example, control processors (CPU), ports, hardware for monitoring failure, memories, and disks such as hard disks as storage devices.

In the prior art, upon allocating hardware resources to the storage subsystem, when the hardware being allocated (hereinafter also including the state being used) out of the recognized hardware is defined and stored in the storage subsystem, the hardware will enter a usable state. The remaining resources not being allocated by the storage subsystem are recognized as a "vacant" state which is not being used. The resources in "vacant" state can be used for example in place of a hardware element experiencing failure during use, or for expansion when there is lack in the performance or capacity of the system.

However, according to the storage system of the present invention, the resources that have not been allocated by the block storage micro-controller will not be used as resources of the block storage subsystem, and they are not "vacant" resources, so that basically they cannot be used later by the block storage micro-controller. According to the prior art system configuration, such resource state does not occur, the resources could not be recognized as "vacant" status by the storage subsystem.

Figure 2:
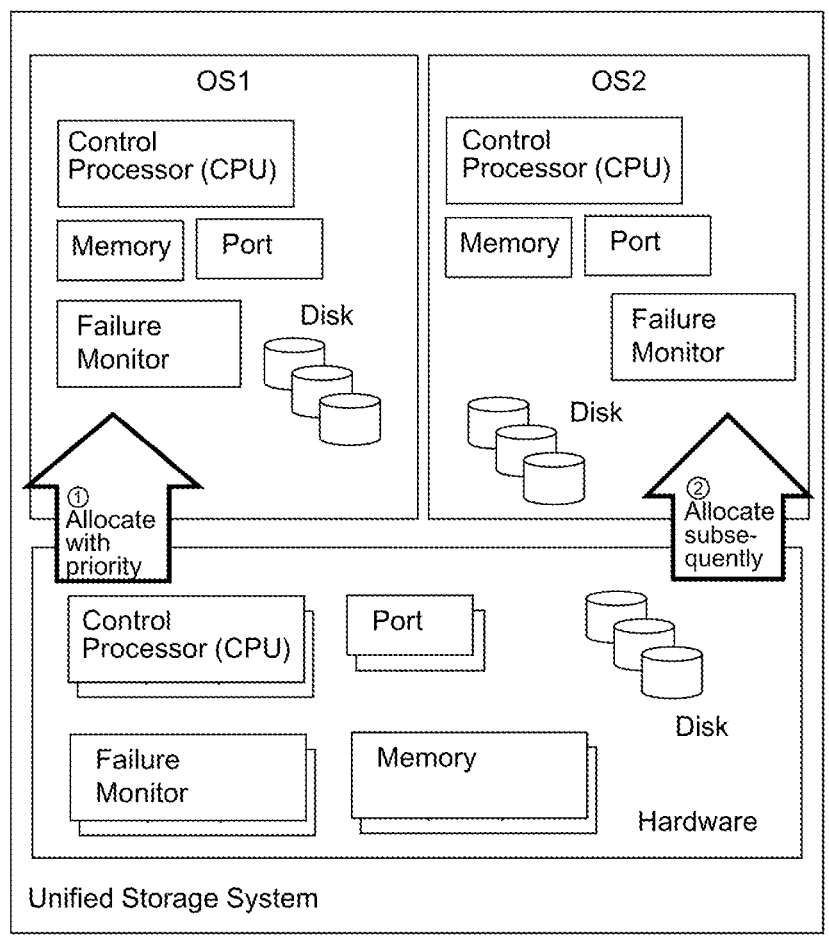
FIG. 2 is a different conceptual diagram of a method for allocating resources.

FIG. 2 is a conceptual diagram of a different resource allocation method. The drawing illustrates a configuration of a unified storage system in which a plurality of OSs coexist, and for example, there is a single OS1 and one or more OS2.

In the description, a block storage micro-controller is shown as an example for providing a service via a block interface, and a file system, a search system, or more widely, Windows, are examples of systems providing service via a file interface. A system operated in a virtualization program, in other words, hypervisor, is shown as a system for providing service via a file interface.

Figure 3:
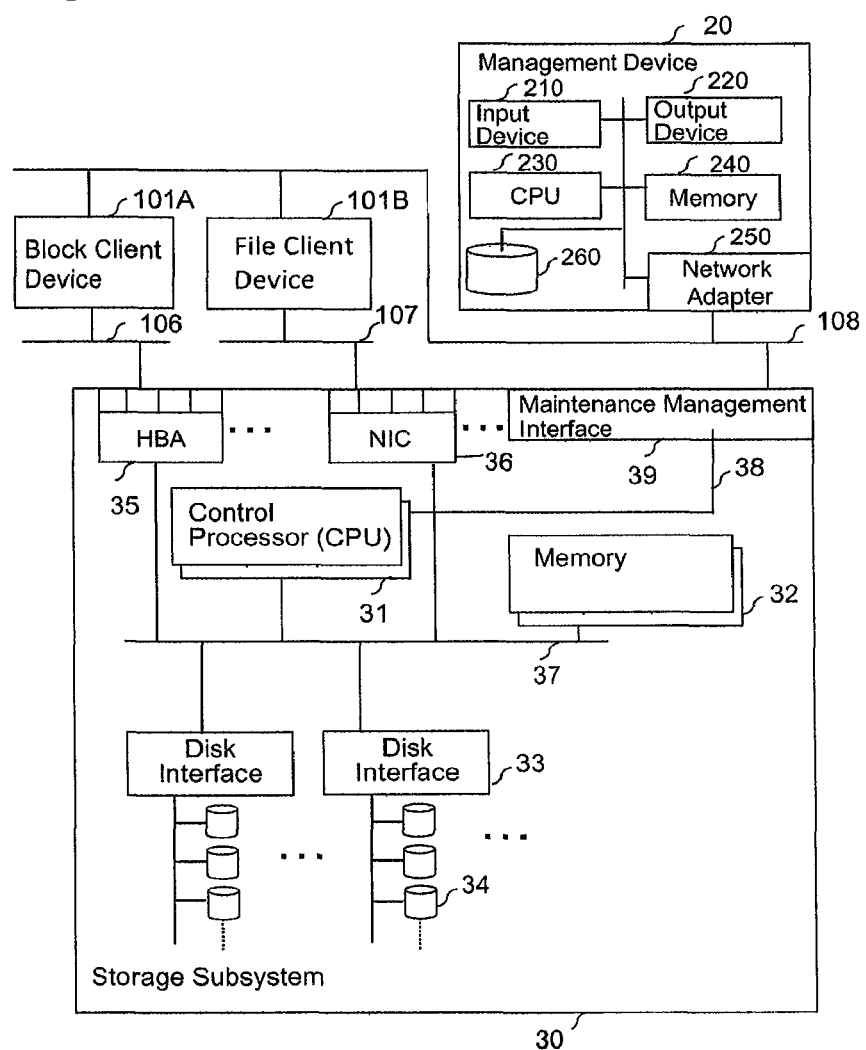
FIG. 3 shows an example of the overall configuration diagram of hardware in the storage system.

FIG. 3 is an example showing an overall configuration diagram of the hardware included in the storage system.

The system includes client devices 101A and 101B, at least one management device (management computer) 20, and at least one storage subsystem 30 to which these devices are connected. The storage subsystem 30 can also be referred to as a storage system, or a unified storage system.

The client devices 101A and 101B are external computers using the storage subsystem 30. The client device 101B is a file client device requesting writing, reading and generating of files with respect to the storage subsystem 30. The client device 101A is a block client device that accesses the logical storage resources of the storage subsystem 30. The actual devices include, for example, personal computers.

Client devices 101A and 101B are equipped with an input device, an output device, a CPU, a memory, and a host adaptor or a network adaptor. The host adaptor or the network adaptor transmit and receive data via the storage subsystem 30 and networks 106 and 107.

The client device 101A can be a server device having an FC (Fibre Channel) or an iSCSI, which are block interfaces. The client device 101B can be a device having an NFS or a CIFS, which are file interfaces.

The management device 20 manages the configuration of the storage area of the storage subsystem 30. The management device 20 is composed of the following elements.

The input device 210 receives input from administrators or the like operating the management device 20, and is composed of a keyboard or the like. The output device 220 displays the status of the management device 20 or items being set, and is composed of a display unit or the like.

The CPU 230 reads a management program stored in a disk drive 260 to a memory 240, and based on the program, executes management processing of the storage subsystem 30. The memory 240 is composed of a RAM or the like, and stores programs and data.

A network adaptor 250 transmits and receives data with the client devices 101A and 101B or the storage subsystem 30 via a management network 108. The management network 108 is composed, for example, of Ethernet (registered trademark). The disk drive 260 is composed of a hard disk device, for example, storing data and programs.

The storage subsystem 30 stores data in the storage area set in a physical device 34.

The storage subsystem 30 includes at least one control processor, a memory and a physical device 34, and more precisely, includes a CPU (Central Processing Unit) 31 as control processor, a memory 32, a disk interface 33, an HBA (Host Bus Adaptor) 35 which is an FC interface (being an HBA target, also referred to as host adaptor), and an NIC (Network Card) 36 which is a LAN interface. The physical device 34 can be any memory which can store the data including a hard disk, an SSD (Solid State Drive) or flash memories.

The CPU 31, the memory 32, the HBA 35, the NIC 36 and the disk interface 33 are mutually connected via a bus 37. The bus is, for example, a PCI-EX, or can be composed of switches.

The CPU 31 is an arithmetic processing unit executing various program and modules stored in the memory 32. The CPU (control processor) 31 controls the storing of data to a storage area composed in the physical device 34.

The memory 32 is a so-called internal storage device, which includes both a nonvolatile memory storing programs operated in a CPU (control processor) 31 and configuration information and a volatile memory for temporarily storing the result of arithmetic processing. The nonvolatile memory within the memory 32 is composed of hard disks and flash memories. The cache memory portion within the memory 32 temporarily stores the data written or read by the physical device 34. A shared memory section stores the configuration information of the storage subsystem 30 or the physical device 34.

The disk interface 33 sends and receives data with the physical device 34, the memory 32 and the like.

The physical device 34 is composed of a plurality of disk devices. The disk devices (storage devices) are composed of hard disk drives, for example, and mainly stores user data. The storage devices can be drives formed of semiconductor memories such as flash memories.

The HBA 35 is connected to the network 106, and executes transmission and reception of commands and data via protocols suitable for data transmission with the block client device 101A (or the host computer). The network 106 can be a FC (Fibre Channel), an Ethernet or the like.

The NIC 36 is connected to a network 107, and executes transmission and reception of commands and data via protocols such as NFS and CIFS with the file client device 101B. The network 107 can be a LAN or Ethernet.

Multiple ports are provided to a single HBA and NIC.

The client devices 101A and 101B transmit and receive data required for system management (management information) via the management network 108 with the management device 20.

The storage subsystem 30 is equipped with a maintenance management interface 39. The interface 39 is connected to the control processor 31 via a network 38 that differs from the bus 37. The network can be a LAN, for example. If failure occurs at a section other then the CPU in the storage subsystem 30, failure can be notified to the management device 20 via the CPU 31.

The program can be stored not only in the memory 32 but also in the physical device 34.

Figure 18:
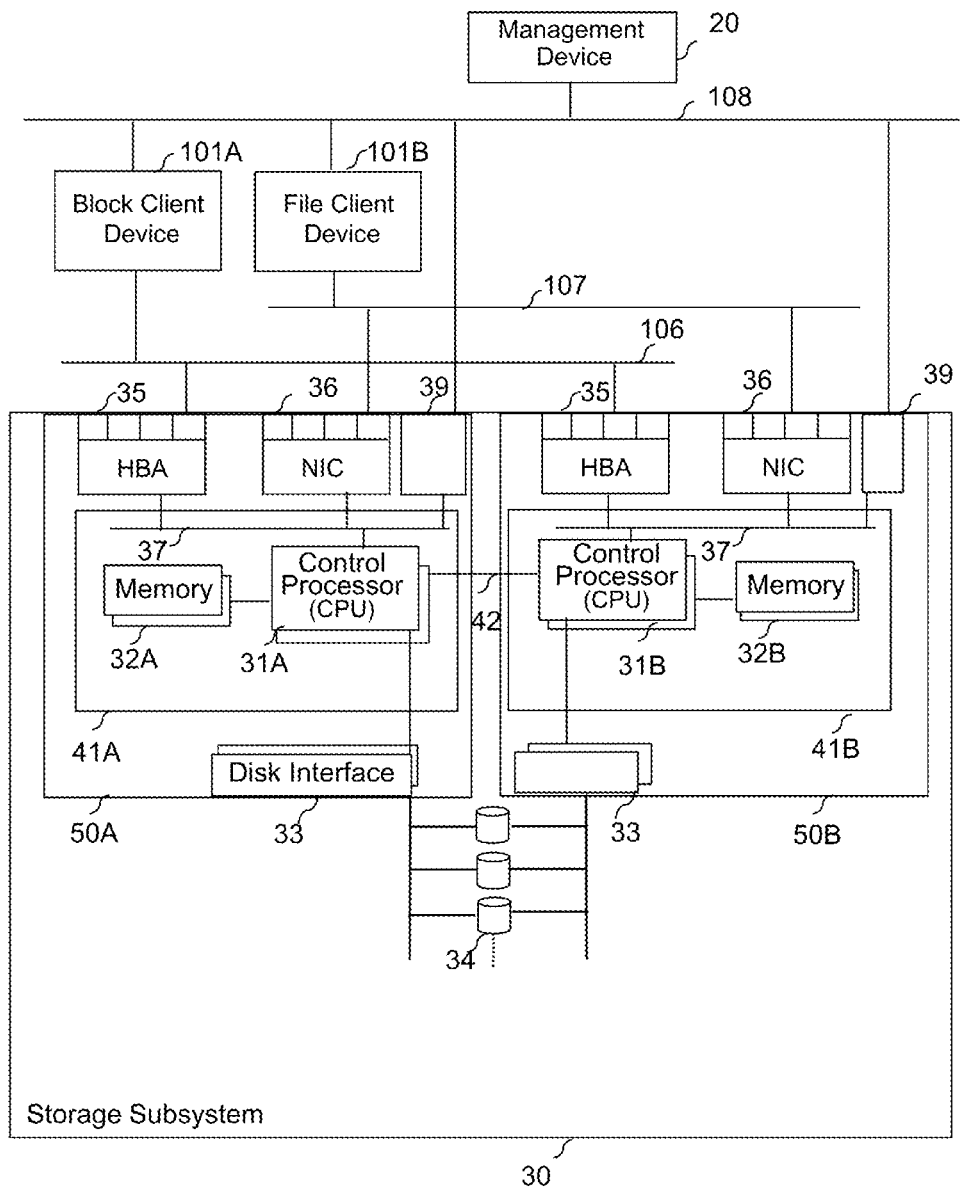
FIG. 18 is an overall configuration diagram of the hardware of the storage system according to another embodiment.

FIG. 18 illustrates an overall configuration diagram of hardware of a storage system according to another embodiment of the present invention.

According to this other embodiment, two controller boards 41 are disposed within the storage subsystem 30. A control processor 31A mounted on the controller board 41A is connected to a control processor 31B mounted on the controller board 41B via a line 42. The line 42 can be a connecting mechanism such as a dedicated bus or a switch. For example, the control processor 31A can access a counterpart memory 32B via the control processor 31B using this line 42.

A cluster 50 includes the controller board 41, the HBA 35 which is the host-side interface, the NIC 36, the disk interface 33, and the NIC 39 which is a maintenance management interface.

A normal cluster server configuration is constituted via an OS operated in a hypervisor other than the block storage micro-controller in cluster 50A and an OS operated in a hypervisor other than the block storage micro-controller in cluster 50B. For example, in the case of an FOS which is an OS using a file system, a certain FOS of cluster 50A and a certain FOS of cluster 50B constitute a cluster configuration in advance, wherein an FOS in the primary cluster 50A and an FOS in the secondary cluster 50B constantly confirm via means such as a heartbeat whether the other FOS is operating normally within certain time units. When the FOS in the secondary cluster 50B detects that failure has occurred in the file system on the primary cluster 50A side, the cluster 50B determines that the FOS of whole cluster 50A has failed, and the FOS of the cluster 50B takes over the process of the FOS of the cluster 50A to continue operation, thereby realizing a fail over process. By adopting such configuration, the reliability of the whole system can be enhanced.

A block storage micro-controller 314 is operated as a single common controller astride cluster 50A and cluster 50B. In other words, the processor of cluster 50A and the processor of cluster 50B operate by referring to a single control information.

According to another variation, the line 42 is capable of realizing communication only between block storage micro-controllers 314 in control processors 31A and 31B, wherein the memory 31A used by the block storage micro-controller 314A and the memory 32B used by the block storage micro-controller 314B are shared among block storage micro-controllers 314A and 314B, and the contents of memories 31A and 31B can be the same.

Figure 4A:
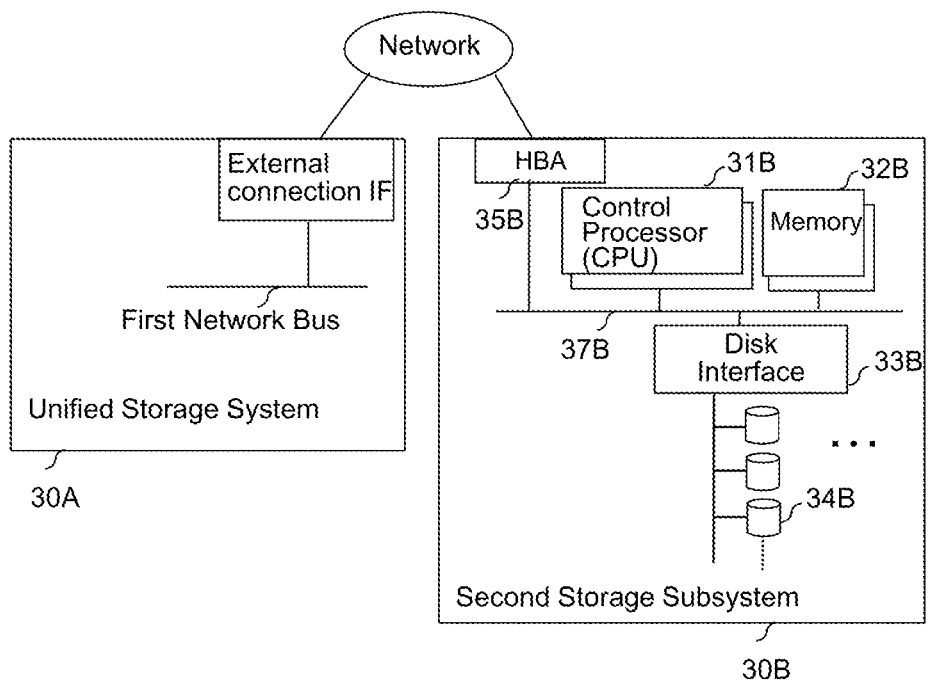
FIG. 4A is a view showing an example in which a second storage subsystem is coupled to the unified storage system.

FIG. 4 illustrates a variation example of the overall configuration of the unified storage system. For example, an external storage system can be coupled to the unified storage system (FIG. 4A). The unified storage system 30A has an external connection function. The second storage subsystem 30B can be externally connected to the unified storage system 30A via this function. The external connection function is disclosed in Japanese Patent No. 4704659.

Now, we will describe the external connecting function. The second storage subsystem 30B can be the same as or different from the unified storage system 30A. Moreover, the unified storage system 30A corresponds to the storage subsystem 30 shown in FIG. 3.

As already described, the unified storage system 30A provides one or more logical volumes to the server. Each logical volume is recognized as a single storage device from the server. For example, the logical volume provided by the unified storage system 30A is associated with the physical device 34 (or the virtual device created from the physical device 34) within the unified storage system 30A. In this case, when the unified storage system 30A receives a write command to the logical volume, data is stored in the physical device 34 associated with the logical volume.

Further, the logical volume provided by the unified storage system 30A can be associated with the physical device 34B within the second storage subsystem 30B. In this case, when the unified storage system 30A receives a write command to the logical volume, a write command for writing data into the physical device 34B associated with the logical volume is generated. The unified storage system 30A sends the generated write command to the second storage subsystem 30B. The second storage subsystem 30B stores the data in the physical device 34B based on the write command received from the unified storage system 30A.

As described, the function for storing the data stored in the logical volume provided by the unified storage system 30A actually in the second storage subsystem 30B connected outside the unified storage subsystem 30A is called an external connecting function.

Figure 4B:
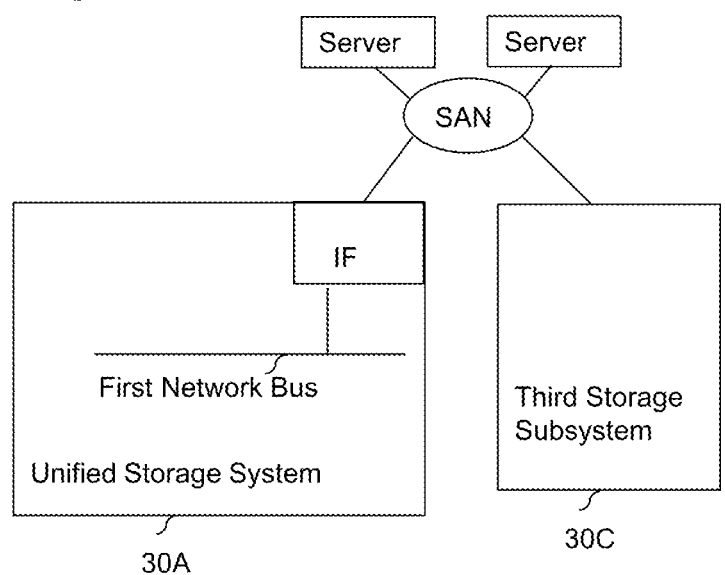
FIG. 4B is a view showing an example in which a third storage subsystem is coupled via a SAN to the unified storage system.

Further, the unified storage system 30A can be connected to a SAN or other external network. FIG. 4B illustrates an example in which the unified storage subsystem 30A is externally connected to the third storage subsystem 30C via a SAN.

Figure 5:
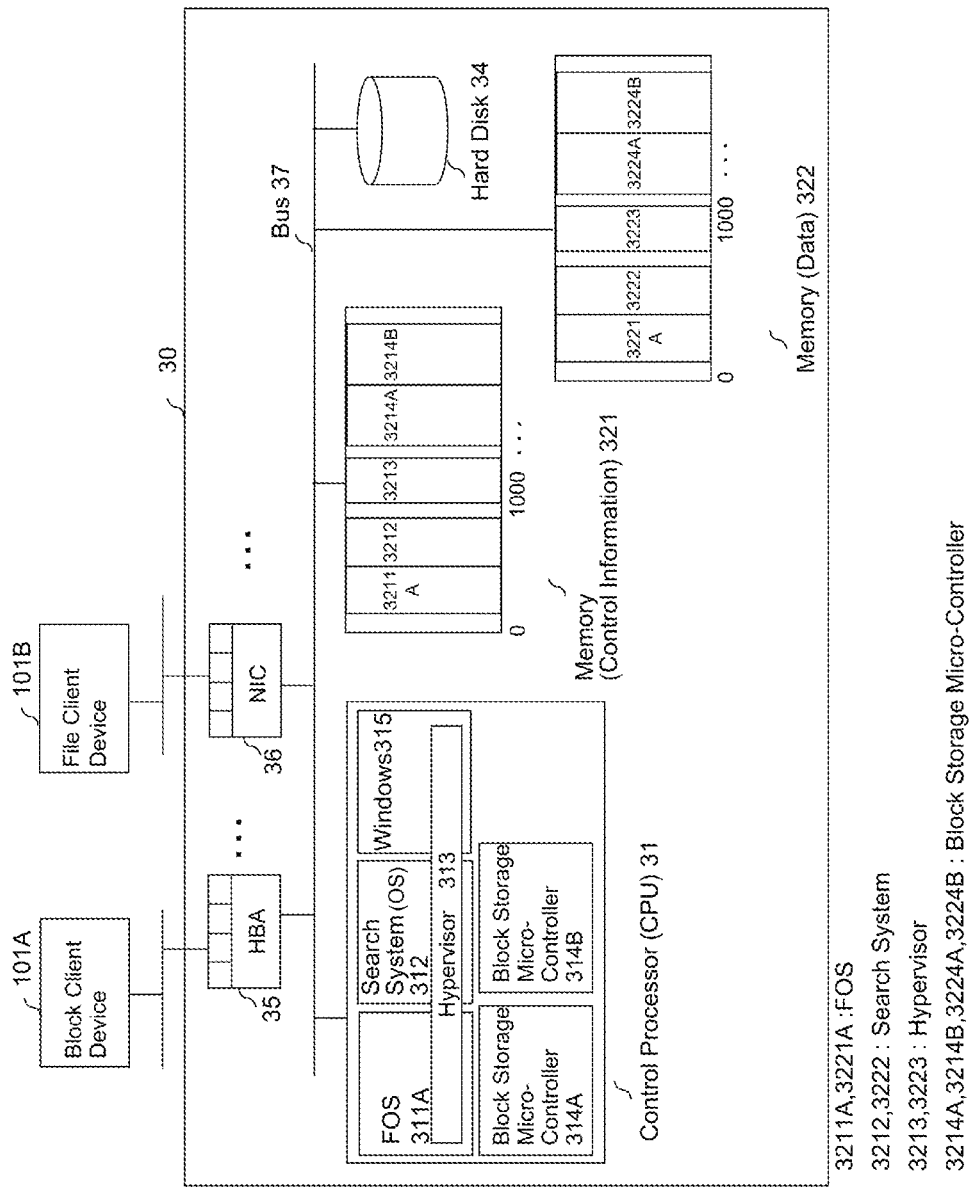
FIG. 5 is an image view of hardware and software for describing the operation of the storage system.

FIG. 5 shows an image view of a hardware and a software for describing the operation of the storage system. For simplification, only the necessary sections for description of the hardware configuration of FIG. 3 are illustrated.

The respective OSs and the block storage micro-control unit operate within a core of a CPU as the control processor. Actually, the OS is a program which is stored in a memory, and the program is read by the CPU and operated therein, but for description, each OS is illustrated as being disposed in a core. Normally, there are a plurality of cores in the package of a single CPU, and in order to provide redundancy for responding to failure or the like, the number of packages are increased or decreased in units of two. In other words, the number of packages in a minimum configuration is two. As an example of the use of the processor core, the same types of OS can be concentrated in a single package, or the OS can be dispersed so as to enable division into physical packages. The design can be performed by considering whether to prioritize the performance, the availability or the like.

Since the hypervisor is also a software, it is stored in a memory. Since the hypervisor is operated in each OS, it does not correspond to each core, so that it stores OSs other than the block storage micro-controller. In FIG. 5, a plurality of cores are in a certain control processor 31, or package, and to each core is disposed a FOS 311A, a search system 312, a Windows 315, and block storage micro-controllers 314A and 314B.

The hypervisor 313 is assembled to each of the FOS 311A, the search system 312 and the Windows 315. In the hypervisor 313, the FOS 311A, the search system 312 and the Windows 315 are operated. In some cases, other FOS 311B and other system 313 are disposed in another control processor. In that case, the hypervisor 313 can have the FOS 311B and the other system OS 313 operate therein, or in another hypervisor 313B. Here, FOS refers to the OS that uses the file system.

The hypervisor can also be operated in a specific core.

Memories having different properties, such as nonvolatile memories and volatile memories, can exist in a mixture as the memory. In any case, the memories are duplicated to retain redundancy. Memories include configuration information of the storage subsystem, control information such as request commands and address mapping information, and cache-memory-like elements for storing read/write data.

The memory for storing the control information (or configuration information) and the memory used with a cache memory-like purpose for storing data should have the areas to be used divided either logically or physically. The memories can include different types of memories, such as non-volatile memories and volatile memories. The memories storing control information and memories used for cache memory-like purposes should have the areas to be used divided logically or physically for each block storage micro-controller, the FOS and other OS using the memory.

FIG. 5 illustrates an allocation example of the memory 32. The memory 32 is a physically divided memory, composed of a memory 321 for storing control information and a memory 322 for storing data. The memories 321 and 322 are used by being divided by address space to correspond to each OS being used. Each OS is capable of recognizing only the memory space allocated thereto. For example, FOS 311A only recognizes the space of FOS 3211A and FOS 3221A, and uses these spaces. An FOS program is stored in the FOS 3211A and the FOS 3221A.

The block storage micro-control unit 3214 of the memory 321 stores the various programs read and executed via the processor 31, a configuration information related to the setting of the logical volume, and pool information related to the setting of the pool. Transfer data and the like are stored in the block storage micro-control unit 3224 of the memory 322.

The various programs read and executed via the control processor 31 includes the following.

A command control program interprets the command from the client device 101 or the management device 20, and executes the process stated in the command. A configuration control program realizes processes such as setting of configuration of the storage subsystem 30 or the update thereof. A disk I/O program controls accesses to the physical device 34.

Configuration information is information necessary for setting environments of the storage system such as virtual devices, logical devices, tiers and RAID groups. Further, an address management table and a logical device management table are stored as configuration information.

The address management table includes address mapping information among target devices, logical devices, virtual devices and physical devices, mapping information of the target devices and logical devices, mapping information of logical devices and virtual devices, and mapping information of virtual devices and physical devices.

The storage subsystem 30 can recognize by referring to the address management table which address of a logical device corresponds to the address of the target device. Further, the storage subsystem 30 can recognize which address of a virtual device corresponds to the address of the logical device. Moreover, the storage subsystem 30 can recognize which RAID group the address of the virtual device belongs to, and which address of which physical device the virtual device corresponds to.

Whether the data is stored in a certain physical location or stored via the capacity virtualization function is determined by the control of the block storage.

When the block storage-side hard disk is used, the storage location can be determined by distinguishing whether the hard disk is an I/O of FOS or a block.

Figure 6:
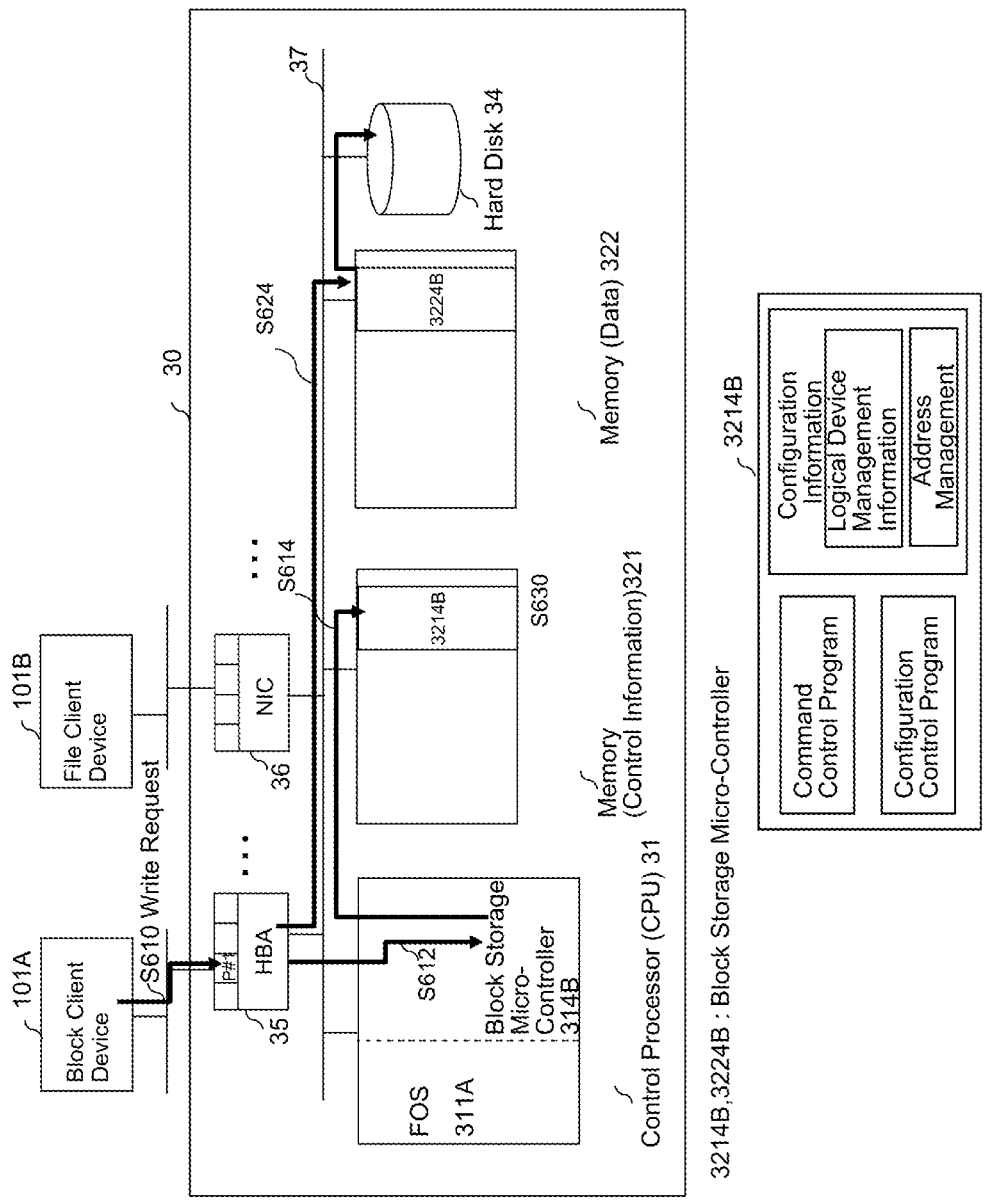
FIG. 6 is a view showing the outline of the flow of I/O processing to the block storage side.

FIG. 6 shows an outline of the flow of the process when an I/O to the block storage side is received. The process will be described with reference to the flowchart of FIG. 15.

A block client device 101A outputs a write request to P #1 which is a #0 port of HBA 35 (S610). The following processes are executed via a block storage micro-controller 314B unit within the control processor 31 (a single core within the processor board). OS other than the block storage OS, such as the FOS, is also disposed in the control processor 31, but they are not related to execution. The block storage micro-controller recognizes the type of the command. If the command is a write command, the procedure advances to S612, and if the command is a read command, the procedure advances to S642 (S611).

When the aforementioned request is stored in the buffer area of the HBA 35, the block storage micro-controller converts the data subjected to the write request to the address to be stored, that is, to a command in the form capable of being processed by the block storage. Here, the block storage is converted to the LU and the address number provided to the server (S612). The block storage micro-controller stores the converted command to its own memory area (S614). During storage, the data is also subjected to redundant processing, such as duplex processing.

The command control program performs an LU—logical device—virtual device address conversion (S616). Thereafter, a hit miss determination on whether the write target address is allocated in a cache memory or not is performed (S617).

If hit miss is determined (if cache memory is not allocated to the write target address) (S617: No), the command control program allocates a cache memory area for storing the write data (S618).

Next, the command control program reports to the block client device 101A that the data reception preparation is set (S620).

When the command control program receives the transfer data from the block client device 101A, the program stores the data in an allocated cache memory (S624), and sends a write complete report to the block client device 101A (S626).

The block storage micro-controller stores a request in a process standby queue (S630). The block storage micro-controller extracts a request sequentially from the process standby queue, and processes the same in order. This is the same flow as the processing of block storage data according to the prior art. In other words, the command control program performs a virtual device—physical device/external LU address conversion (S632), and computes the address of the media storing the write target data (S634). Here, the media is a physical device 34 in FIG. 3. The data stored in the cache memory is written to the media address (S636). With this flow, the write data is stored in the physical device 34.

A memory 3214B stores an I/O queue for queuing so as to process the request commands sequentially. A memory 3224B stores a cache memory for storing data, a buffer for CPU operation, and so on.

Figure 16:
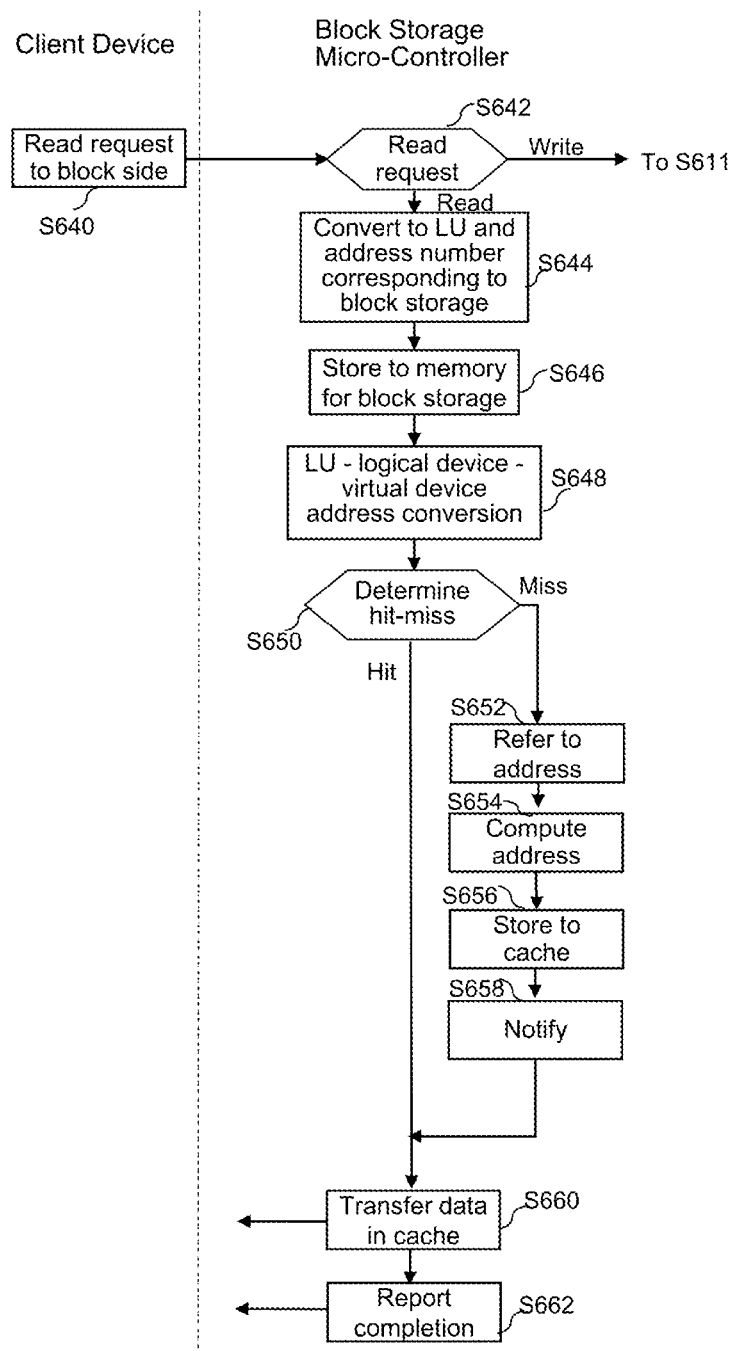
FIG. 16 is a flowchart showing a read processing performed to the block storage side.

Read processing is performed in a similar manner. A flowchart of the process is shown in FIG. 16.

The process is the same as the write processing until the command is received.

The block client device 101A issues a read request. The processes from S644 to S648 are the same as the aforementioned processes S612 to S616.

The command control program performs an LU—logical device—virtual device address conversion, and performs a hit miss determination on whether the data of the read target address exists in a cache memory or not (S650).

If the data of the read target address is in a cache (S650: Yes), the command control program transfers the data in the cache to the block client device 101A (S660), and notifies completion to the block client device 101A (S662).

If the data of the read target address is not in the cache (S650: No), the command control program performs a virtual device—physical device/external LU address conversion (S652), computes the address of the media storing the read target data (S654), and starts a media access program.

The media access program reads data from the computed media address, stores the same in the cache (S656), and notifies the command control program that data has been stored to the cache (S658). When a notice from the media access program is received, the command control program transfers the data in the cache to the block client device 101A (S660), and notifies completion (S662).

As described above, the processing of I/O to the block storage side does not go through a hypervisor. Thus, the overhead that occurs by going through a hypervisor is eliminated, and the deterioration of performance is suppressed.

Figure 19:
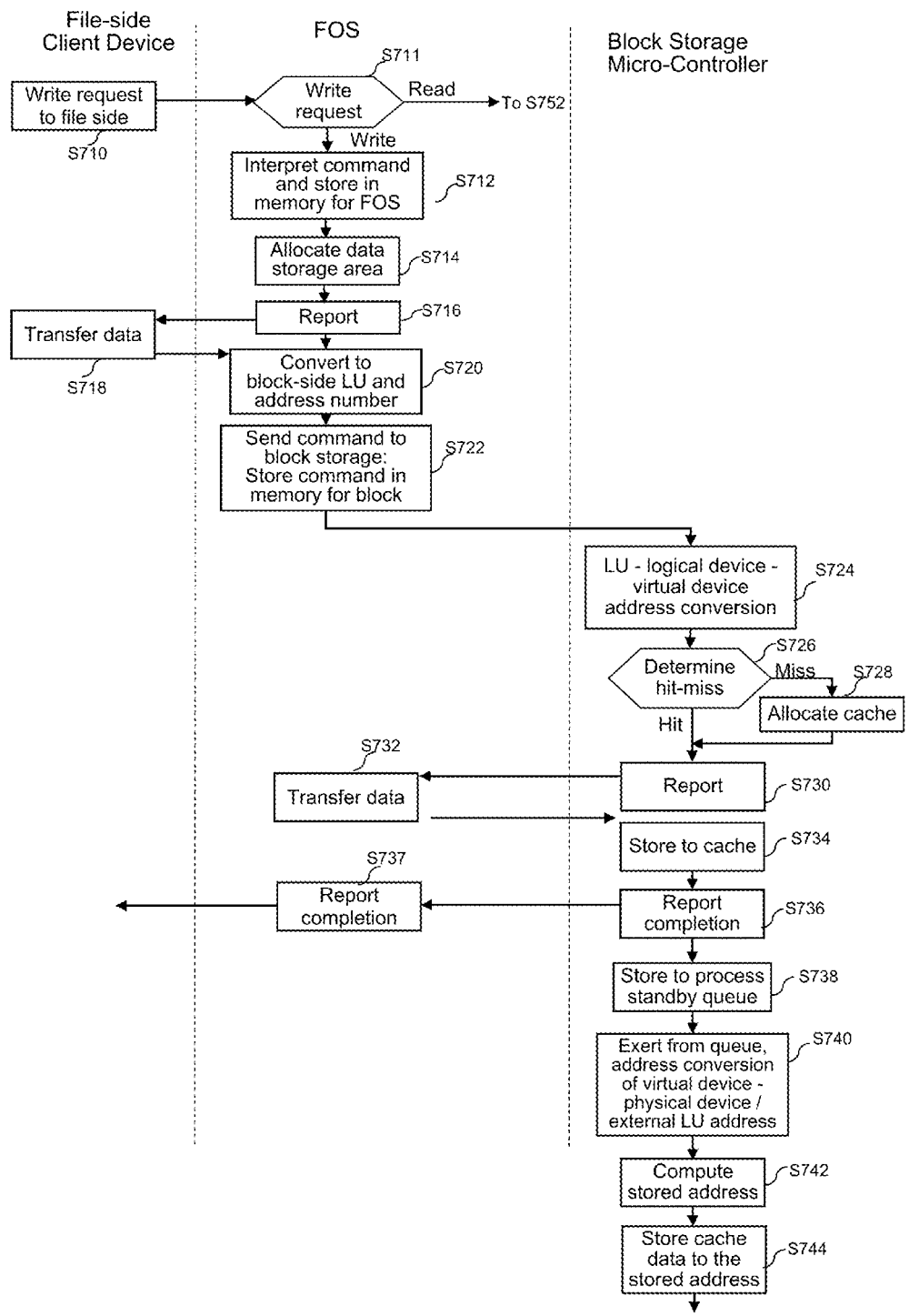
FIG. 19 shows a flowchart of write processing performed to the FOS side.

As an example of the I/O not directed to the block storage, FIG. 7 illustrates a flow of the process when the FOS receives an I/O, which will be described with reference to the flowchart of FIG. 19.

A file client device 101B sends a write request to a port (S710). In the drawing, the request is sent to port P #2 of #0 of NIC 36. The FOS 311A recognizes the type of the command. If the command is a write command, the procedure advances to S712, and if the command is a read command, the procedure advances to S752 (S711). The form of request includes a write request to a file system, or a request taking the form of directory information.

Port P#2 of #0 of the NIC 36 transfers the request to the allocated OS (S712). In FIG. 7, the FOS 311A stores the write request in a memory used exclusively by FOS.

A buffer area for storing the write data is allocated from the FOS area of the memory 322 (S714). When the area is allocated, a report notifying allocation is sent to the file client device 101B (S716). The file client device 101B having received the report transfers the write data to the FOS (S718).

When the hypervisor virtually provides the HBA and stores the request in the virtual HBA, the FOS converts the request command to LU number and address (S720). The request is stored in the memory in the converted form. Now, the virtual HBA is, for example, a software mounted within an FOS control memory. The memory storing the request is defined, for example, as a shared area of the block storage micro-controller and the FOS, and set as a memory area that can be accessed from both the block storage micro-controller and the FOS. Thereby, the block storage micro-controller can read the stored request command directly and start the process. As another method, the system does not have a shared area, and the FOS copies the request from the FOS area to the block storage micro-controller area, or switches the memory areas of the block storage micro-controller and the FOS.

In order to notify the block storage micro-controller side that the request to the FOS side has been stored in a shared area, either an interruption is sent from the FOS side to the block storage micro-control unit, or the block storage micro-control unit checks the request queue at given intervals and selects a request and performs processes if a process standby command exists (S722).

In the following process, address conversion is performed similarly as the process of S616 and thereafter via the block storage micro-controller (S724), so as to perform a hit-miss determination (S726). If a cache is allocated, a report is sent to the FOS side to transfer data (S730), by which data is transferred from the FOS to the block storage side (S732), wherein the data is stored in the cache on the block storage micro-controller side (S734).

Actually, data transfer is performed by inter-memory copying of data from a memory address used by the FOS storing data to a memory address used by the block storage. In another example, the addresses of a memory area storing the data to be managed and a memory area of the copy destination block storage micro-controller side are converted. If the physical data storage addresses of the copy source and the copy destination are the same, it may be possible that no substantial data copying process occurs. In that case, the program within the hypervisor performs a process to assume that the data is stored in another area and copied thereto.

If the block storage-side cache memory is allocated and prepared, a notice is sent to the FOS side to start data transfer. Either an interruption is sent from the block storage micro-controller to the FOS, or a message is transmitted.

The FOS side having received the request copies the data to the block-side memory if the data is stored in its own memory area, and if not, has the write data transmitted thereto from the file client device.

If write data is stored in the cache of the block storage micro-controller side, a completion report is sent to the FOS side (S736). The FOS receives a completion report from the block storage micro-controller side, and notifies write complete to the file client device (S737).

Figure 15:
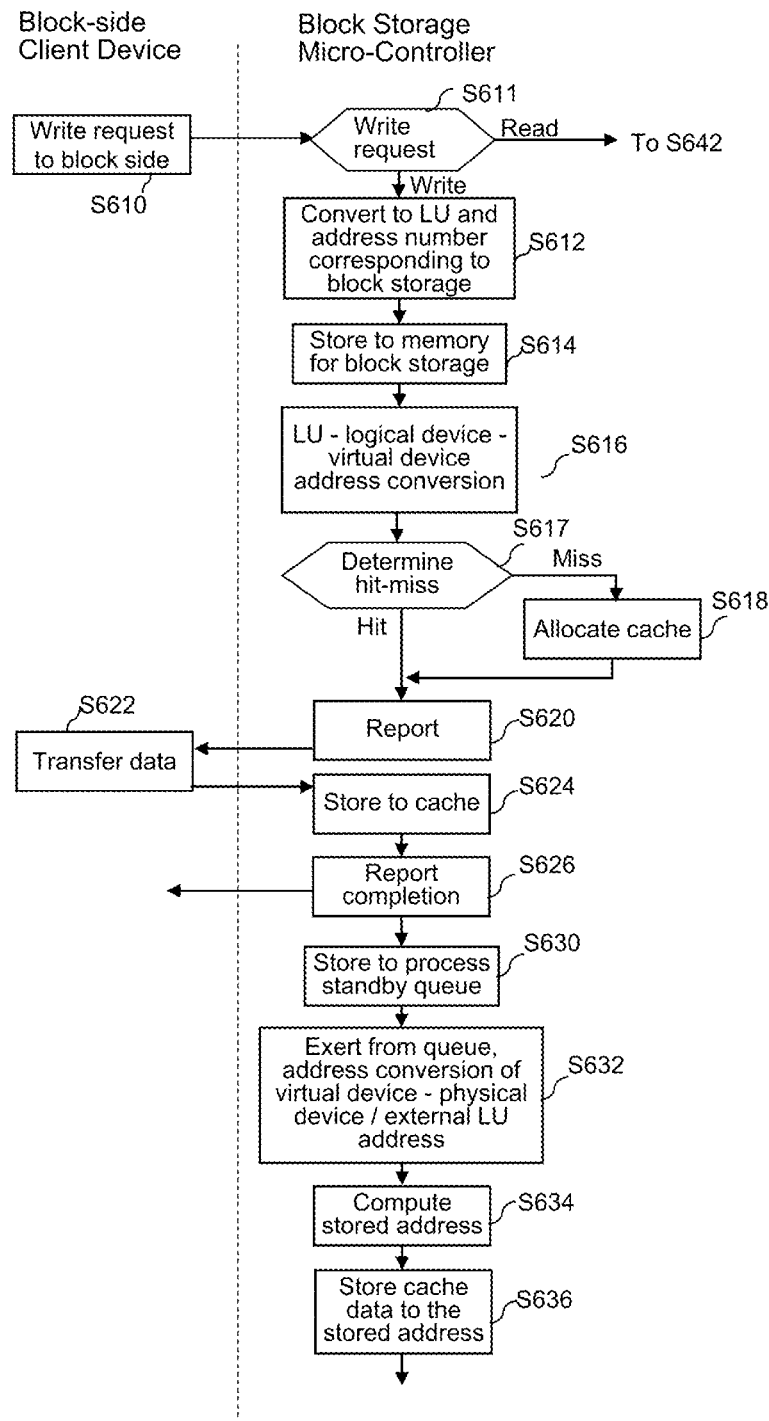
FIG. 15 is a flowchart showing a write processing performed to the block storage side.

The processes of S738 and thereafter are similar to the process of steps S630 and thereafter of FIG. 15.

Figure 20:
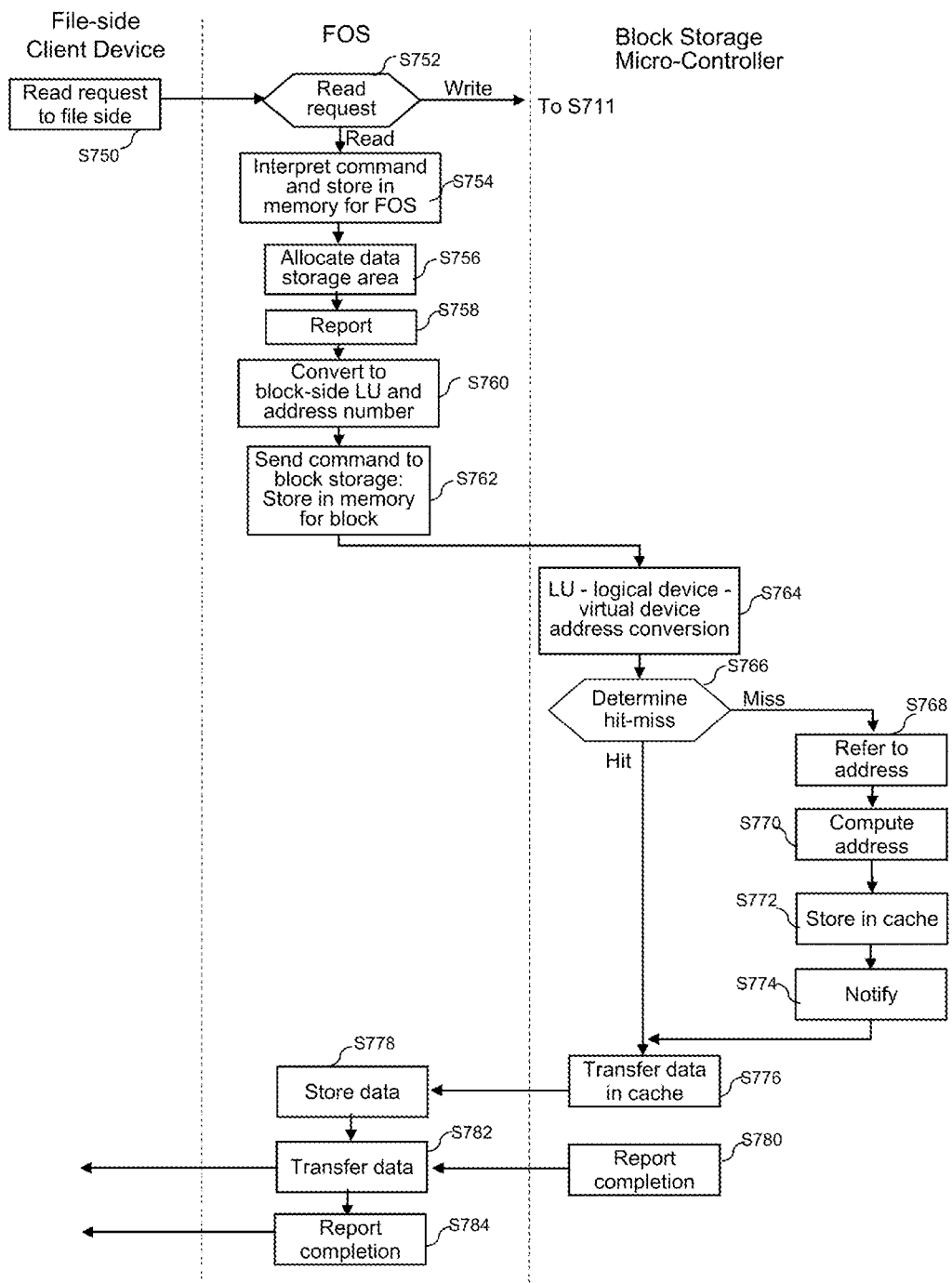
FIG. 20 is a flowchart of a read processing performed to the FOS side.

Read processing is performed similarly. FIG. 20 illustrates a flowchart thereof.

The steps until command reception are similar to the write processing.

The file client device 101B issues a read request. The processes of S754 to S764 are the same as the processes of S712 to S724.

The command control program performs LU—logical device/virtual device address conversion (S764), and performs a hit-miss determination on whether the data of the read target address is stored in the cache memory or not (S766).

If the data of the read target address is stored in the cache (S766: Yes), the command control program transfers the data in the cache to the FOS (S776), and reports completion to the FOS (S780).

If the data of the read target address is not in the cache (S766: No), the command control program performs a virtual device—physical device/external LU address conversion (S768), computes the address of the media storing the read target data (S770), and starts a media access program.

The media access program reads data from the address of the computed media and stores the same in the cache (S772), and notifies the command control program that the data has been stored in the cache (S774).

When the command control program receives the notice from the media access program, it transfers the data in the cache to the FOS (S776), and issues a completion report (S780).

The transfer of data to the FOS side is actually performed via inter-memory copy. This process is similar to that performed during write processing. The FOS recognizes that data has been transferred, that is, data has been stored in its own area, or that the data has been stored in a shared area of the memory (via a similar method as the write processing) (S778). The FOS transfers data to the file client device 101B (S782).

As another embodiment, a cache memory is disposed not only on the block micro-storage side but also on the FOS side. In that case, the cache hit miss determination is performed also in the FOS side. If data already exists in the FOS-side cache, data is transferred as it is during a read request and the process can be completed. In the case of a write request, the process can be completed at the point of time when write data is stored in the cache on the FOS side, or can be completed at the point of time when write data is stored in the block storage-side cache.

In the process of FIGS. 6 and 7, the request queue processed by the block storage micro-control unit can be assembled. The request stored in S614 can be entered to the queue in the shared area 3220. Further, after storing the request temporarily in the shared area 3220 in S738, the request can be entered to the request queue in the block storage micro-controller 3214A.

In a normal FOS, the HBA is retained in a hardware, converted to a SCSI command and accessed via the FC I/F and SAN to the storage subsystem side. As described, according to an integrated storage system configuration, expensive HBA becomes unnecessary, and direct connection within the configuration is realized, so that costs can be reduced and performances can be enhanced since there is no need to provide a SAN therebetween.

FIG. 8 illustrates an example of a hardware resource management table.

Based on this information, it is possible to recognize which hardware is operated or closed due to failure, and the OS or the block storage using the hardware.

FIG. 8A shows a hardware resource management information 801A that the block storage micro-controller stores. This information relates to the whole hardware resource disposed in the storage subsystem 30. The table stores a resource name 802A storing the CPU number, a core number 803A for each CPU, and information 804A on whether it is defined on the block storage side.

In 804A, "defined" is stored for the resource used by the block storage, and "undefined" is stored for the resource not used thereby. CPU 1 and CPU 2 store "defined" since they are used by the block storage. CPU 3 stores "undefined" since it is not allocated by the block storage micro-controller, and recognizes that it is used by an OS other than the block storage micro-controller. Normally, information indicating that it is undefined is stored, but as a variation, it is possible to receive the hardware information used by the hypervisor from a system other than the block storage micro-controller (such as a hypervisor, a management server or a different device), and enter the actual resource allocation status thereto.

In 812A, resource name of the memory is stored, and in 813A, address of the memory space is stored. Whether the block storage micro-controller side has allocated each address or not is stored in 814A. Address 1001 and thereafter are shared with other OS. For example, during the read/write request processing described with reference to FIG. 7, the request command targeting FOS or other systems than the block storage micro-controller is converted. Now, the above-described address is the address storing the converted command when process is assigned to the block storage micro-controller, wherein the address is the area that can be accessed both from the FOS side converting the command and the block storage micro-controller referring to the command and performing processing. The information of 814A does not manage whether the information is shared, and manages whether the block storage can be used or not.

Similar management is performed for other hardware resources, such as ports and hard disks. In the case of ports, for example, there are FC ports and Ethernet, the numbers of which are respectively managed.

The table only storing information on the resources defined in the block storage is created based on the management information of the whole hardware of table 801A. Examples of such tables are tables 821A and 831A illustrated in FIG. 8A. Table 821A shows the information of the CPU that the block storage uses, wherein CPU1 and CPU2 are CPUs used by the block storage, and the status of use thereof is during use. Status of use 823A stores information such as during use or failure closure.

Table 801A is referred to by both the block storage micro-controller and the hypervisor, so that the table is stored in a memory area visible from both elements.

FIG. 8B shows the hardware resource management information that the hypervisor stores.

Hardware resource management information 801B and 811B are information that the hypervisor has, and are stored in a memory area used by the hypervisor. The table 801A storing the management information of all the hardware that the block storage micro-controller has is referred to, and only those having the undefined status of use are entered to tables 801B and 811B (ports are not illustrated, and HDDs are not included since they are not used). At first, whether the resource is already being used or not (in other words, whether the resource is already allocated in the block storage micro-controller side or not) is stored at first, and thereafter, the result of having the resource divided and allocated to FOS or other OSs is stored. The hypervisor manages the users of the respective resources.

The addresses 1001 to 2000 within the memory are shared areas with the block storage, but they are set as the hypervisor area.

The hypervisor virtualizes hardware resources and presents them to the FOS or the like, so that as shown in 821B, a physically single CPU3 is virtualized as a plurality of CPUs, VCPU1 through VCPU4, wherein each of the plurality of CPUs is allocated to the OS stored in the hypervisor. Therefore, when a failure described later occurs and the failure is detected, it is necessary to examine the extent of influence of the failure to the OS and to perform failure processing when physical failure occurs.

A hardware resource use information 801C of FIG. 8C is the information that the respective OSs other than the block storage has, and only the resource information that can be used internally is stored. Since the already described area that can be shared with the block storage micro-controller can also be used internally, the status of use thereof is managed as during use.

FIG. 9 shows a directory device information table 901 used as information for converting the FOS-side request command. The directory device information table 901 illustrates the corresponding relationship between the file system name or directory information and the LU information provided from the storage side as the location in which the file is mounted. This table is stored in the FOS side. In the present embodiment, the LU is provided from the storage side in a 1:1 relationship with respect to the file system. As another variation, not only the LU information but also the corresponding relationship with the address information within the LU can be stored.

Figure 10:
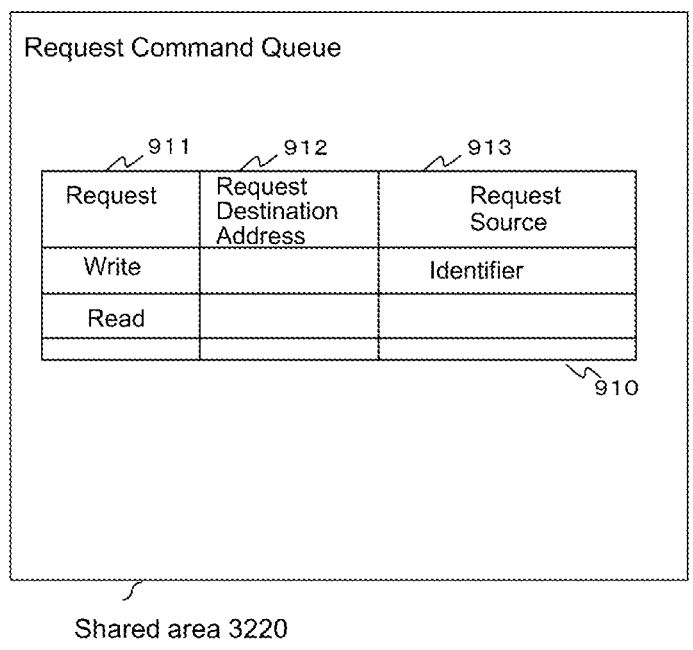
FIG. 10 is a view for describing sharing of command with the block storage micro-controller side.

FIG. 10 illustrates a method for sharing the commands from the FOS to the block storage micro-controller side.

Column 913 stores the request source of a command, which clarifies the destination of sending the completion report when the processing of the command is completed. For example, in the case of a block storage, since the port and the LU number are recognized as the command issue source, this information is stored. Upon processing a command, scheduling may be performed by distinguishing the request source, so that the request source is distinguished by storing the ID of the SCSI or the WWN. The block-side request occurs similarly, wherein the request can be written into the same request command queue, or the request command queue can be stored in a different memory area. If the request is stored separately, a rule becomes necessary to determine the processing order among queues. If a command is completed, the block notifies completion of the command.

Figure 11A:
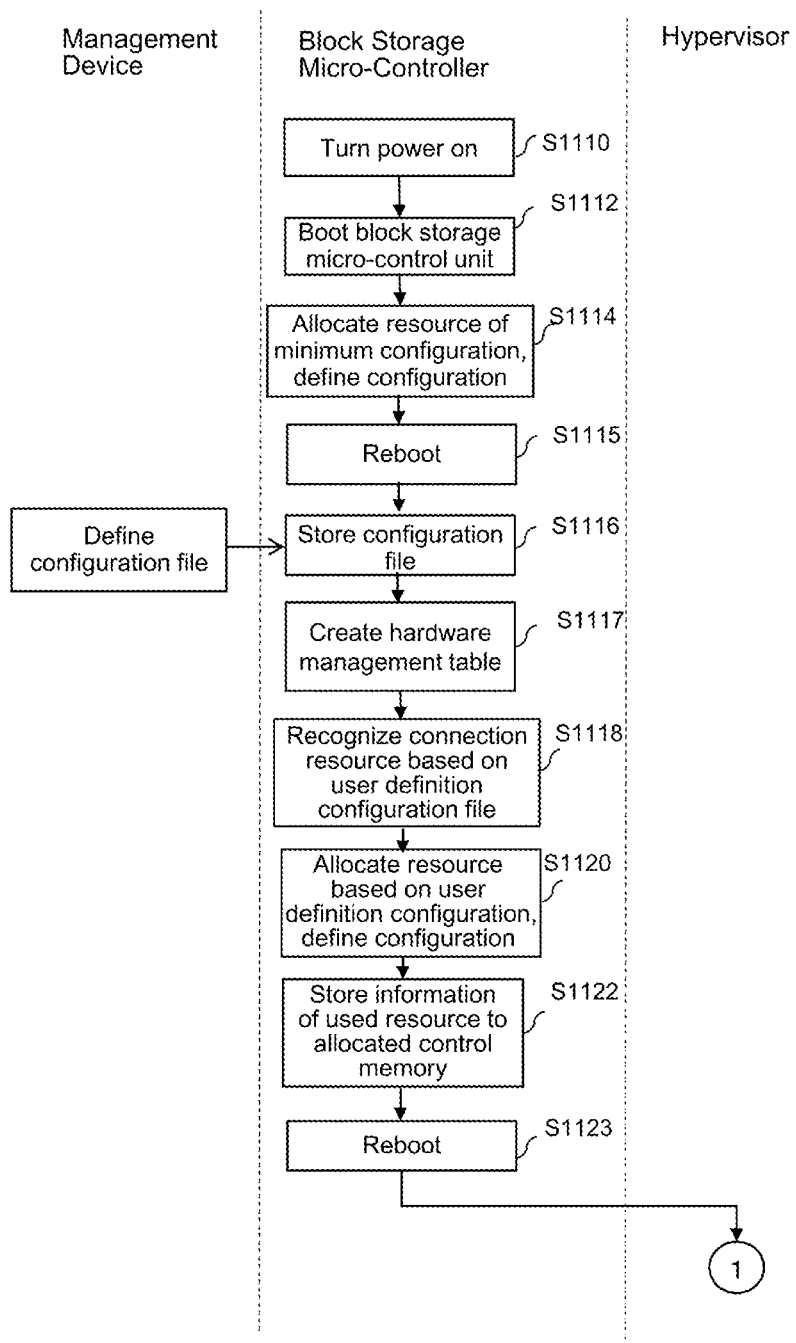
FIG. 11A shows a process for allocating a hardware resource to a block storage subsystem side.
Figure 11B:
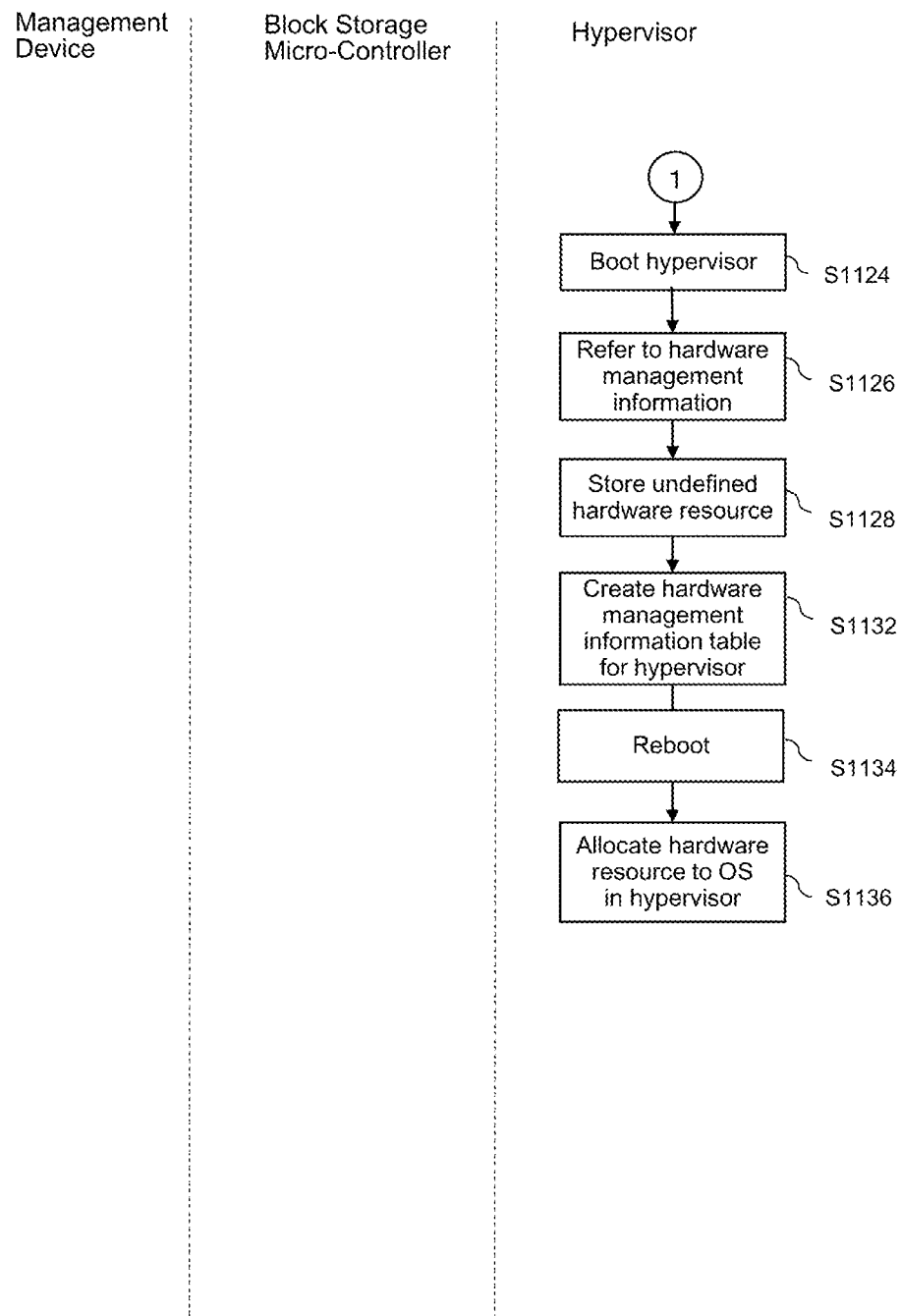
FIG. 11B shows a process for allocating a hardware resource to an OS other than the block storage.

FIGS. 11A and 11B show the steps of the process for allocating a hardware resource to a block storage system side and to other OSs.

At first, the power of the storage subsystem 30 is switched on (S1110). Only the block storage micro-controller is started (S1112). As described, the present device characterizes in booting only a portion of the system within a single casing. The configuration of the block storage micro-controller is determined to be a minimum configuration at the initial state (or at a state where it is detected that a configuration information is not defined) (S1114). Minimum configuration refers to the block storage-side configuration, which for example is a 2 PK (package) configuration, within a maximum of 8 PK configuration. As described, in default, the block storage micro-controller is started in a minimum configuration. The physical CPU cores and memories used when composing the control via a minimum configuration are determined in advance. At this time, system is rebooted in order to fix the configuration (S1115).

The user considers the block storage-side configuration in advance via the management device, and the information having determined the number of hardware components required in the device configuration is stored in the configuration information (S1116). The configuration information defines a required number of each component including a processor core and HDD. A block storage subsystem based on the configuration stored in the configuration information is constructed. The user considers the number of hardware resources that each component constituting the block storage subsystem requires, and the resources that the OS or FOS other than the block storage subsystem requires and determines the number thereof so as to have necessary resources required by the FOS or the like remain. If reboot is performed, the block storage micro-controller can recognize the hardware connected in the storage subsystem 30, and create the management table of 801A (S1117). This information is stored in the memory area when the control is started via minimum configuration.

Next, based on the contents of the configuration information, the hardware resources connected to the block storage subsystem is recognized (S1118). The recognized hardware resources are stored in the management table of 801A. The hardware resources are allocated based on the contents of the configuration information, and the configuration is defined (S1120). Actually, "defined" is stored in the status of use of 801A. Tables 821A and 831A storing the information on the hardware resources being used are constructed, and stored in the control memory allocated for the block storage micro-controller (S1122). The system is rebooted to fix the configuration (S1123).

Further, the hypervisor is activated (S1124). The hypervisor refers to the hardware management information 801A stored in the memory area shared with the block micro-control unit, and recognizes the whole hardware (S1126). The hypervisor stores the information having the status of use "undefined" to its own memory area (S1128). The hypervisor recognizes that the undefined hardware resources can be used, and creates hardware management information tables 801B and 811B for hypervisor (S1132). The hypervisor reboots its system and fixes the configuration (S1134). The hypervisor further constructs table 821B, allocates the same to the plurality of OS operating in the hypervisor, and stores the allocated information to tables 811B and 821B (S1136).

As another method (FIG. 11C), the hypervisor is started (S1142). The hypervisor recognizes all the hardware resources connected in the storage subsystem 30 (S1144). The hypervisor sends a report to the block storage micro-control unit that the hypervisor is activated (S1146). The block storage micro-control unit having received the report provides to the hypervisor the resource information that the unit uses stored in its memory (S1148). The hypervisor stores the received information in its own memory area (S1150). The hypervisor first recognizes which hardware resource can be used based on the received information, and allocates the memory area for the hypervisor (S1152).

A hardware management information table for the hypervisor is created in the allocated memory area and stored therein (S1154). The hypervisor is then rebooted (S1156). The resources that can be used are allocated to the plurality of OSs operating in the hypervisor (S1158). The allocated information is stored respectively in the memory area that each OS uses (S1160). Now, it is not necessary to provide a hypervisor-side resource allocation information to the block storage micro-control unit. There is a method for sharing information by sharing the address information or for performing inter-memory copy as a method for handing over the used hardware resource information from the block storage micro-control unit to the hypervisor.

The processes from S1146 to S1150 are the processes that the prior art hypervisor does not perform. The process that the hypervisor performs for allocating resources to a guest OS exists in the prior art, but the process of receiving a usable resource information from other OS and the process of determining the resource to be used based on the received information do not exist in the prior art.

The allocation of memory is performed by designating an address or a capacity within a memory space. The allocation is performed in a duplicated configuration considering failure or the like.

FIG. 12 is a flowchart showing the steps for defining configuration when resources are added. When a hardware resource is added, the user creates a configuration information again in the management device including the added resource, and stores the same. The block storage micro-controller in the ON state recognizes the hardware resource being connected thereto according to the configuration information defined by the user. The trigger for recognition can be output as a command from the user to the storage subsystem 30, or can be a detection means that the storage subsystem 30 has. Configuration is defined in a similar manner as the flowchart of FIG. 11. In principle, the operation relates to allocating the added hardware resource, and the resources already being used maintain its initial allocated state. The process performed on the hypervisor side is the same as the steps starting from S1126 of FIG. 11B.

When a resource is added, in principle, the resources being currently allocated maintain the allocated state. The added resource is allocated to the block storage micro-controller side and to other sides.

The present embodiment differs from the prior art in which during addition of resource, the hypervisor does not reboot, but acquires the information on the addition of resources and capability of use by the block storage micro-controller, and performs allocation to a guest OS.

Next, the process of reducing the resources, that is, deleting the resources, will be described below.

If the resource being the delete target is the memory space, from where in the memory space the memory capacity should be deleted is determined. The data stored in the memory space to be deleted and the control information are saved in the memory space not being deleted. For the subsequent step, the copy destination data is used. Similar to the flowchart of FIG. 12, the user recreates the memory space address deleted via the management device as a configuration information and records the same. The following steps are the same as the flowchart of FIG. 12.

If the resource being the delete target is a processor, when a delete order is output, the processor being the delete target will not start a new process until an on-going process is completed and ended. At a break of the process, the data such as the process standby queue that the processor being deleted has is assigned to another processor. The processor having the data assigned merges the information with the process queue that the processor originally has, and stores the information in its own memory. An unusable (or closed) status is stored in the information of the resource being deleted. The following steps are similar to the flowchart of FIG. 12.

Deleting of disks can be performed in a similar manner as the prior art method of storage systems.

Figure 13:
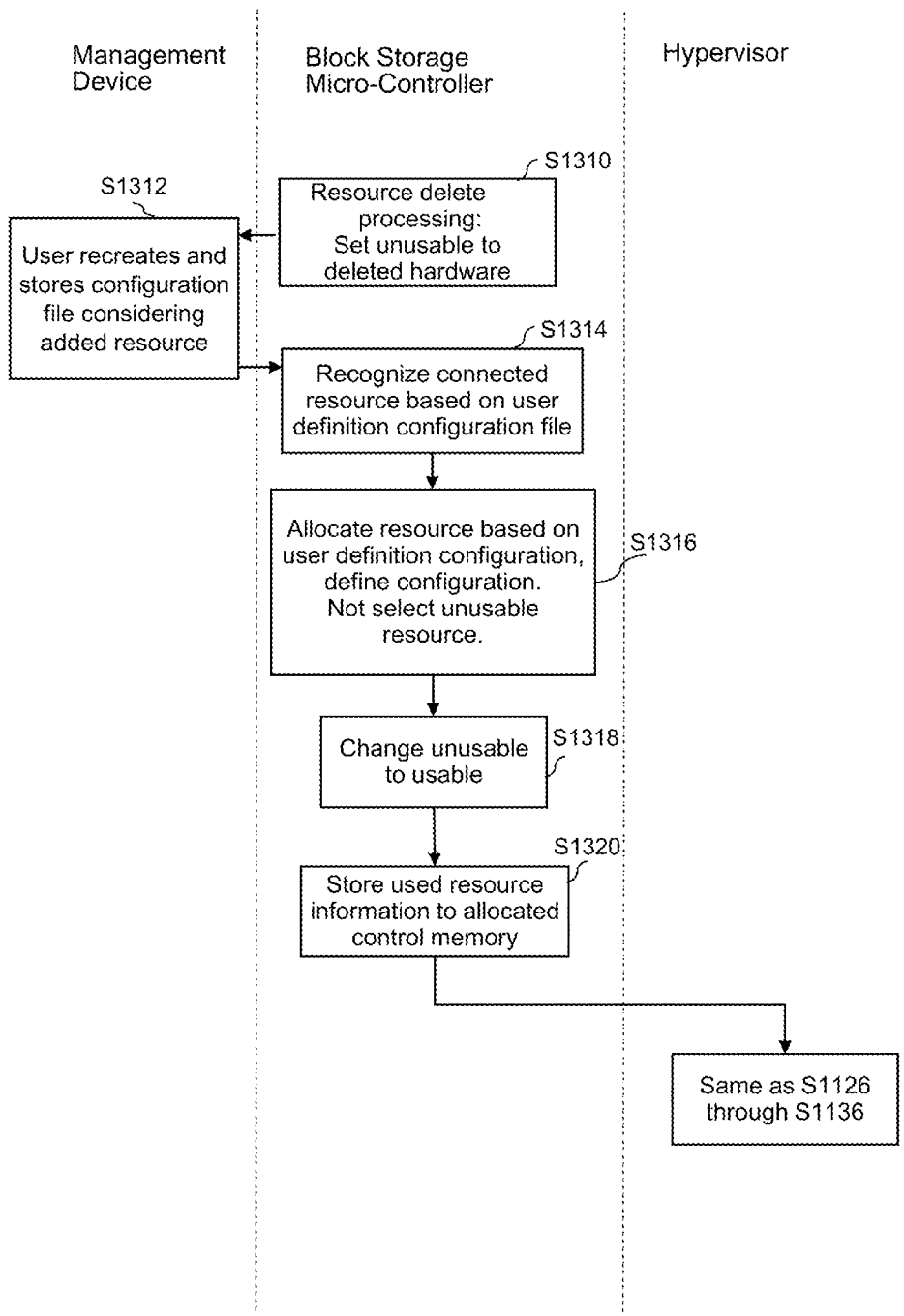
FIG. 13 is a flowchart showing a process for dynamically reallocating a hardware resource of the block storage to a target other than the block storage.

FIG. 13 is a flowchart showing the process for dynamically reallocating a hardware resource of a block storage to a system other than the block storage.

The use of resource being a delete target from the hardware used in the block storage side is stopped based on the aforementioned resource delete process. The resource being deleted is set to unusable state or the like, and prevented from being used (S1310). When the user recreates a configuration information, the resource being the delete target is designated so as not to be selected (S1312). This can be realized by not designating an unusable memory address, for example. Based on the configuration information recreated by the user, a resource is allocated from the connected hardware resource, and the configuration is defined (S1316). Thereafter, the status of use of the hardware set to unusable state is changed to usable state (S1318). The subsequent steps are the same as steps S1126 to S1136 of FIG. 11B.

Figure 14:
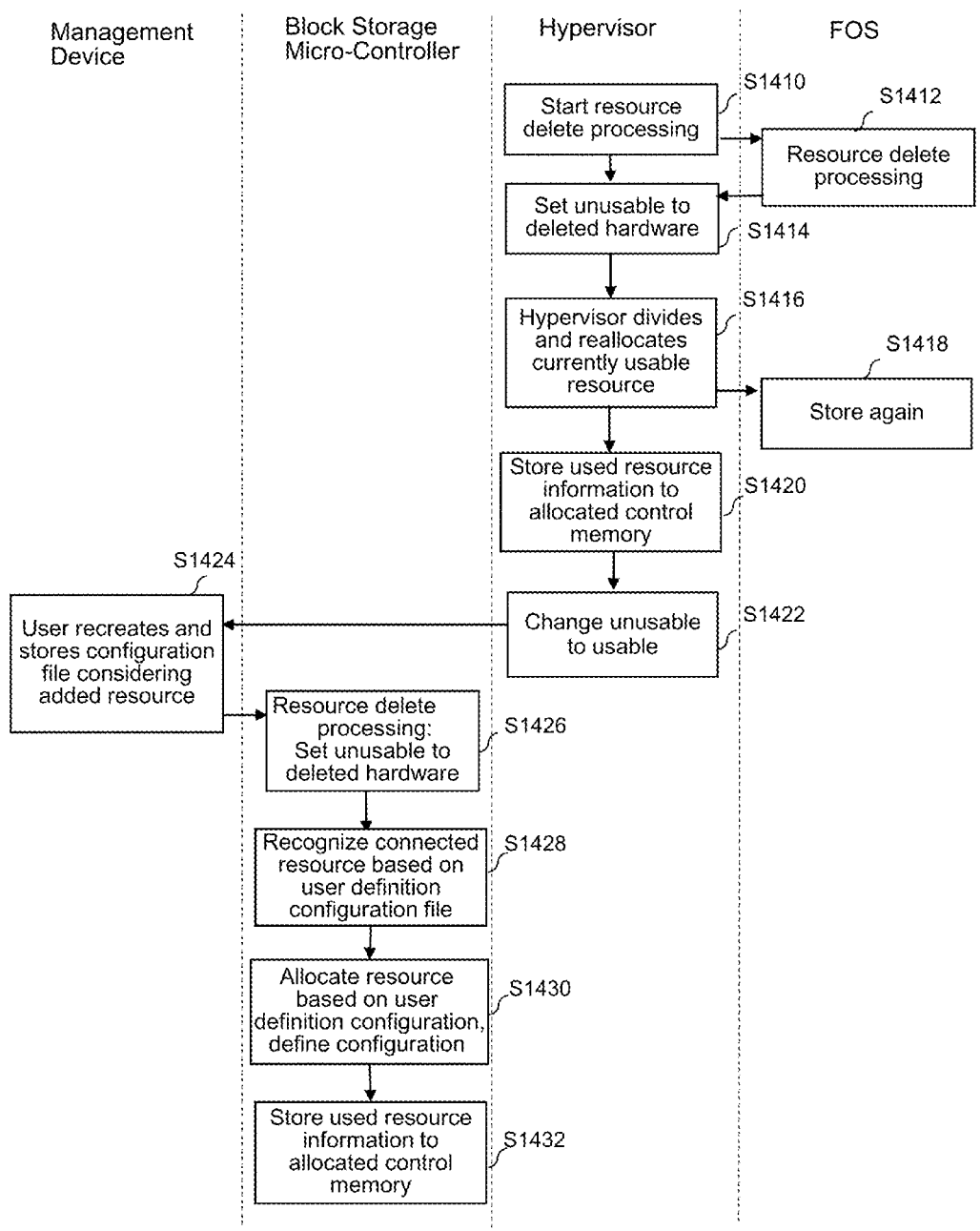
FIG. 14 is a flowchart of the process for dynamically reallocating a hardware resource used by a system other than the block storage to the block storage side.

FIG. 14 is a flowchart showing the process for dynamically reallocating a hardware resource used by a unit other than the block storage to the block storage side.

For example, when hardware performance becomes excessive such as by downsizing the file system on the FOS side, hardware can be released from the FOS side and reallocated to the block storage side.

The process of deleting a hardware resource is performed via the process described earlier. The hypervisor starts a delete processing (S1410), and causes the respective OSs to execute the delete processing (S1412). After deleting is performed, the hypervisor reallocates the resource that can be used currently (S1416), and stores the information in the hypervisor (S1420). The recreation of the configuration information and the reallocation (addition) of the hardware resource to the block storage side that follows is performed similarly as the flowchart of FIG. 12.

Figure 17:
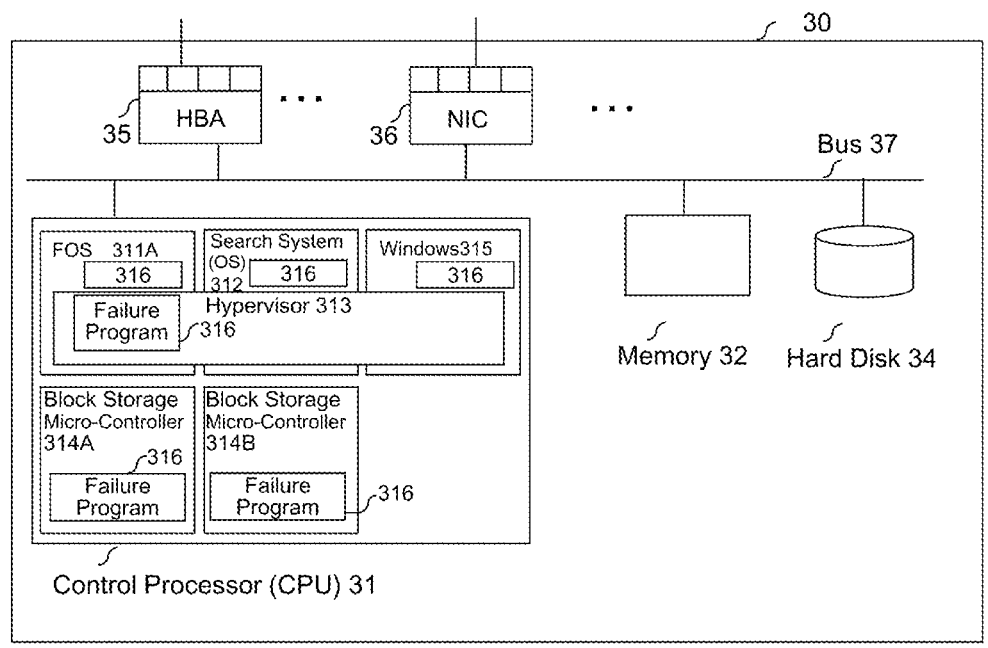
FIG. 17 is a view showing the area where failure program exists within the storage subsystem.

One of the cooperating processes of the block storage micro-controller and the hypervisor is a failure processing. Conventionally, the OS was disposed to each casing of the storage subsystem, and each OS stored an environmental system program or a common logic program for performing failure management (such as the failure program 316 shown in FIG. 17). When failure has occurred on the hardware side, failure report was sent to each OS, and a failure response program was started and executed in each OS.

According to the storage system of the present invention, it is necessary to assemble the environmental system programs and common logic programs that had been stored in each OS. When failure occurs to the hardware managed by the hypervisor and each of the failure programs are started, since the tolerance to availability differs from that of the block storage subsystem, if the determination regarding failure of the hypervisor is adopted, the availability of the block storage subsystem is deteriorated.

Further, according to the block storage micro-controller side process, overhead is caused by passing the hypervisor, so that the processing ability of the block storage subsystem side may be deteriorated. In order to enable cooperating processes without deteriorating the availability of the block storage subsystem, the initiative of failure processing is provided to the block storage micro-controller side. Thereby, when failure is detected, a process of first reporting to the block storage micro-controller side is performed.

However, as for the hardware used only by the hypervisor side, it may be unnecessary to perform failure processing. Therefore, the resources being the target of failure processing are separated between the block storage and the hypervisor (the system in charge of the resource is determined). When failure occurs to the resources, whether to dispose the memory area recording the information that failure has occurred (failure occurrence information) on the hypervisor side or on the block storage micro-control unit is determined. If the resource failure relates to failure processing of the block storage micro-control unit, the failure occurrence information is stored in the memory area on the block storage micro-control unit side, and the information is thereby placed on the side of the control unit referring to the information.

Next, failure processing will be described. Similarly in failure processing, the block storage micro-controller and the hypervisor must perform processing cooperatively.

When failure occurs to a hardware within the storage subsystem 30, the failure monitor which is hardware for detecting failure detects the failure.

The target hardware resources can be classified into the following four types.

(1) Resource shared among a block storage and a system other than the block storage (a hypervisor and a group of OS operated in the hypervisor)

Figure 21:
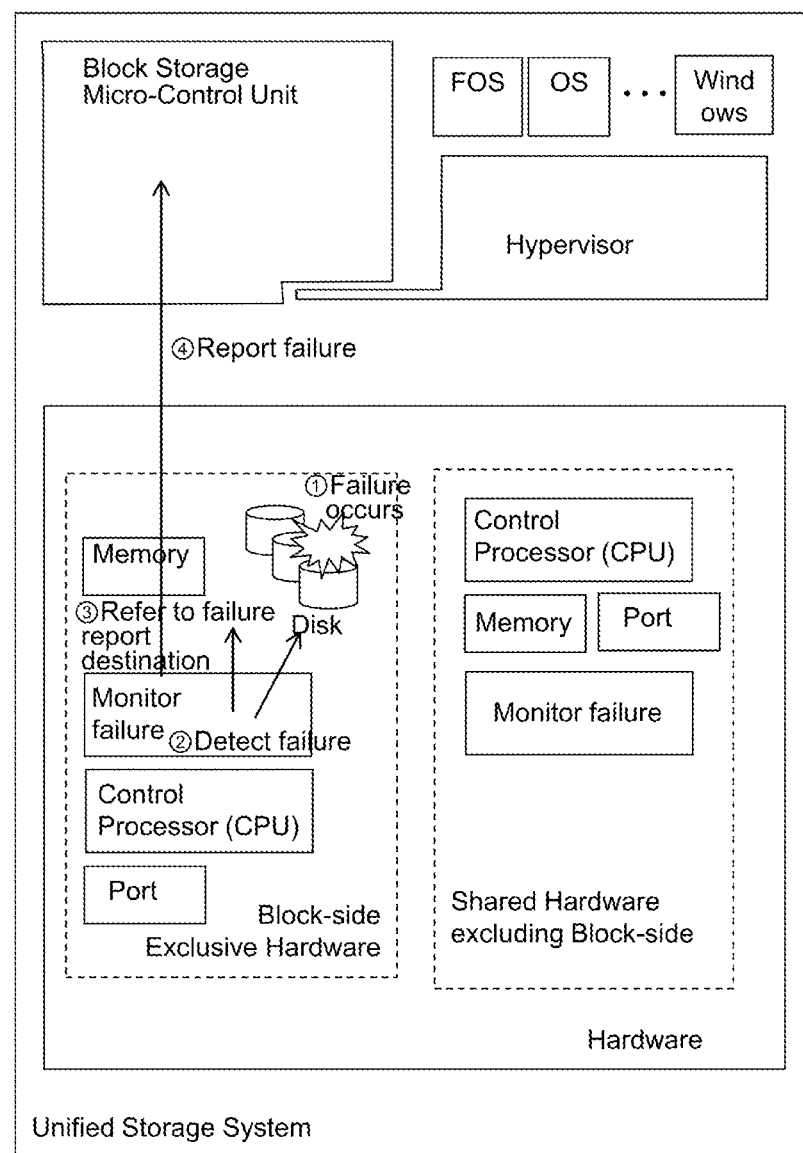
FIG. 21 is a view related to the failure occurring in a block storage-side exclusive hardware.
Figure 22:
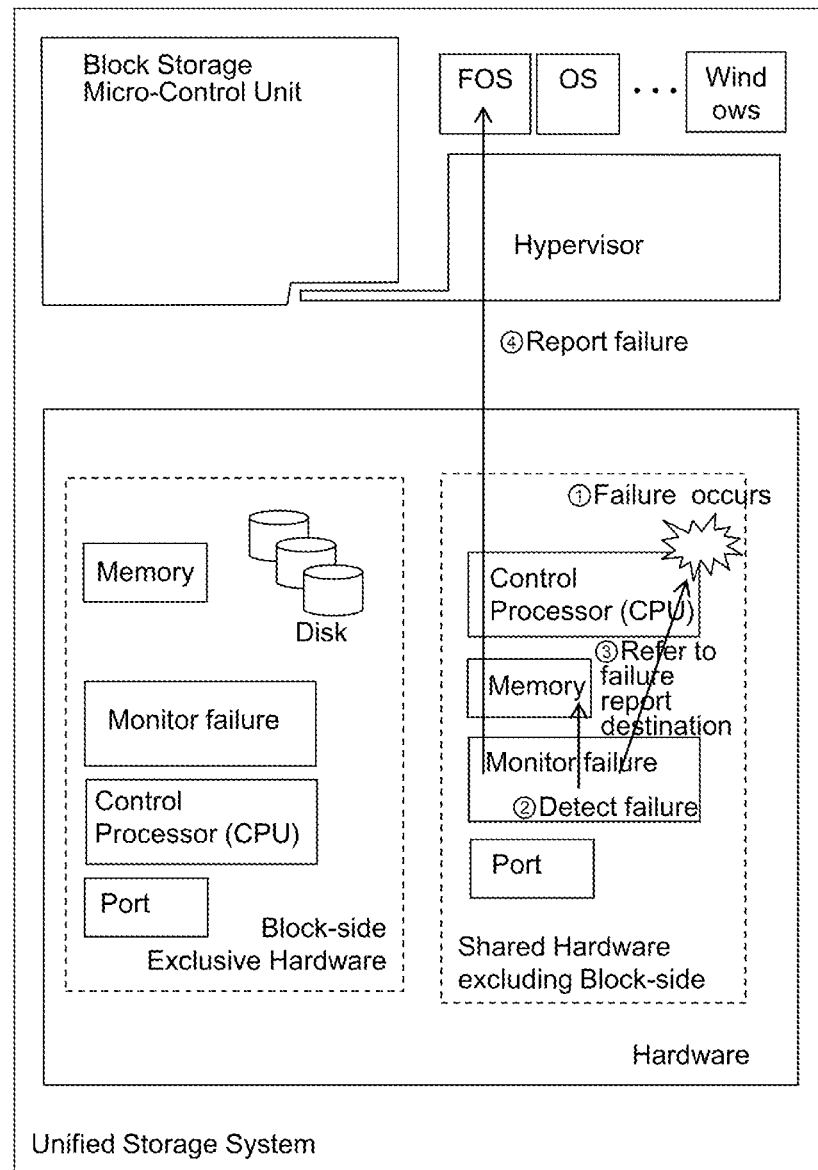
FIG. 22 is a view showing the failure occurring in a shared hardware other than the block storage side.

(2) Resources exclusively used by the block storage (3) Resource shared among OSs operated in hypervisors other than the block storage (4) Resource exclusively used by the OS operated in hypervisors other than the block storage Each hardware resource notifies failure to the side set in advance, and issues an interruption. In the case of (1) and (2), as shown in FIG. 21, a failure is notified to the block storage micro-control unit and interruption is issued. In the case of (3), as shown in FIG. 22, a failure is notified to the hypervisor and interruption is issued. In the case of (4), failure is notified to each OS and interruption is issued.

In order to do so, each hardware resource must store the notice destination regarding the destination of notifying failure. Areas for failure processing are allocated within the memory 321, and failure report destinations of all hardware resources are stored in an information management table, wherein when failure is detected, the information management table is referred to and occurrence of failure is notified to the failure report destination. The information management table is shown in FIG. 23. For example, the user information stored in 2314 of the failure management table 2300 of the CPU will be the failure notice destination. If the user is a block, a response is sent to the block storage micro-controller side, and if the user is an FOS, a response is sent to the FOS.

One example of the above case (1) is a hard disk failure. The hard disks are used by the block storage and various OSs such as the FOS. Therefore, when hard disk failure occurs, since the disk control side does not manage which OS the data stored in the failure section belongs to, so occurrence of failure is notified to the whole system.

Further, in the case of the memory shown in FIG. 23, whether each memory unit is experiencing failure or not is determined. In the present case, the memory is shared (in the case of (1) described above), failure is responded to the block using the memory.

As a method for detecting failure, the hardware such as the CPU, the memory or the disk can recognize an internal failure via failure monitoring. Since a port cannot subject itself to detection, a job may be created to have a failure detection program or the like check whether failure has occurred at certain intervals. When failure is found, an information management table recording the failure report destination is referred to, and the failure destination is searched to report failure. The port reports to either (2) or (4) described above.

When failure occurs to a resource exclusively used by one of the OS operating in the hypervisor, and the OS must perform fail-over, the failure is notified from the hypervisor in which the OS is mounted to the block storage micro-control unit.

Conventionally, the hypervisor recognized all hardware resources being connected thereto, and attempts to detect failure thereof. Further, the block storage similarly attempts to detect failure of all hardware resources. However, in a unified storage system, since hardware resources are divided into a block storage side and a hypervisor side and allocated accordingly, failure processing is also performed in a separated manner. In other words, the processes closed within each OS is performed in the OS, whereas the OS in charge of the process regarding a target used commonly in both sides must be determined in advance. According to the present method, the initiative of failure processing is owned by the block storage micro-controller side having a high recovery performance, but regarding hardware unrelated to the block storage micro-controller side, processing is performed by each OS or the hypervisor.

As for other variations of configuration, the first variation has a failure program disposed only on the hypervisor, wherein the hypervisor manages both the hypervisor and the block storage control side. If the block storage does not exist in the storage system, a failure report is sent to the hypervisor, and the failure processing program in the hypervisor is used to cope with the failure. This failure processing is performed in a level coping with the server or the file system.

The second variation has a failure program disposed only on the block storage micro-control unit. This example corresponds to the case where a hypervisor does not exist from the beginning, or where the hypervisor is deleted in midway. A block storage-level failure processing program is started. In the case a hypervisor is deleted in midway, as a preprocessing for deleting the hypervisor, the failure processing that had been performed by the hypervisor is taken over by the block storage micro-control unit.

The present invention is not restricted to the preferred embodiments, but the present invention can be realized by modifying and realizing the components without departing from the scope of the invention. Various modifications of the invention can be realized by appropriately combining the plurality of components taught in the present embodiments. For example, some components can be deleted from the components illustrated in the embodiments. Furthermore, components of different embodiments can be assembled arbitrarily.

A portion or all of the components, functions, processing units, processing means and the like illustrated in the preferred embodiments can be realized via hardware such as by designing an integrated circuit. Further, the above-described configuration and functions can be realized via hardware by having the process interpret and execute each program realizing the respective functions. The information such as the programs, tables and files realizing the respective functions can be stored in a storage or storage device such as a memory, a hard disk or an SSD (Solid State Drive), or a recording or storage media such as an IC (Integrated Circuit) card, an SD memory card, or a DVD (Digital Versatile Disc) and the like.

Further according to the above preferred embodiments, only the control lines and information lines considered necessary for description are illustrated, and not necessary all the control lines and information lines required for fabrication are illustrated. All components can be mutually connected.

REFERENCE SIGNS LIST

20: Management Device
30: Storage Subsystem
31: Control Processor (CPU)
32: Memory
33: Disk Interface
34: Physical Device
35: HBA
36: NIC
37: Bus
39: Maintenance Management Interface
101: Client Device
106, 107: Network
108: Management Network

The invention claimed is:

1. A storage system, which is coupled to a file type device comprising a file interface and a block type device comprising a block interface, the storage system comprising:
a storage device; and
a central processing unit (CPU) as physical resources which are available for use by a block micro controller for a block type Input/Output (I/O) and by a hypervisor for creating at least one logical partition,
wherein the block micro controller takes a first part of the physical resources, including at least a first part of the CPU for processing the block type I/O, and the hypervisor takes a second part of the physical resources, including at least a second part of the CPU and not taken by the block micro controller, for the hypervisor after the first part of the physical resources is taken by the block micro controller,
wherein the hypervisor creates the at least one logical partition from the physical resources in the second part of the physical resources,
wherein a file Operating System (OS) processes a file type I/O on the at least one logical partition created by the hypervisor,
wherein in response to a first write request sent from the block type device, the block micro controller is configured to store write data corresponding to the first write request in the storage device without involvement of the hypervisor, and wherein in response to a second write request sent from the file type device, the file OS is configured to send a command based on the second write request to the block micro controller, and the block micro controller is configured to store write data corresponding to the second write request in the storage device according to the command.

2. The storage system according to claim 1:
wherein physical resources in the first part of the physical resources are exclusively used by the block micro controller.

3. The storage system according to claim 1:
wherein the hypervisor provides more than two logical partitions and different kinds of OSs, other than for the block micro controller, are performed on each of the more than two logical partitions.

4. The storage system according to claim 1: further comprising a memory,
wherein the physical resources further include at least one of a port and a part of the memory.

5. The storage system according to the claim 1, wherein, in response to receiving a read request from the file type device, the file OS is configured to:
send the read request to the block micro controller, and reply with data sent from the block micro controller,
wherein the block micro controller is configured to read the data requested by the read request from the storage device, and send the read data to the file OS.

6. The storage system according to claim 1, wherein the hypervisor creates the at least one logical partition from the physical resources in the second part of the physical resources.

7. The storage system according to claim 1,
wherein control information is communicated between the file OS and the block micro controller via the hypervisor.

8. The storage system according to claim 1,
wherein, when failure is occurred in the file OS, the failure is notified to the block micro controller via the hypervisor.

9. A system comprising a first cluster and a second cluster, wherein each of the first and second clusters is configured as the storage system claimed in claim 1.

10. A method in a storage system, the storage system coupled to a file client device having a file interface and a block client device having a block interface, and the storage system comprising a storage device, and a central processing unit (CPU) as physical resources which are available for use by a block Operating System (OS) for a block type Input/Output (I/O) and by a hypervisor for creating at least one logical partition, the method comprising the steps of:
taking, by the block OS, a first part of the physical resources, including at least a first part of the CPU, as physical resources for processing the block type I/O;
after the taking of the first part of the physical resources by the block OS, taking, by the hypervisor, a second part of the physical resources, including at least a second part of the CPU and not taken by the block OS, as physical resources for the hypervisor;
creating the at least one logical partition, by the hypervisor, from the physical resources in the second part of the physical resources; and
processing, by a file OS, a file type I/O on the at least one logical partition created by the hypervisor, wherein in response to a first write request sent from the block client device, the block OS is configured to store write data corresponding to the first write request in the storage device without involvement of the hypervisor, and wherein in response to a second write request sent from the file client device, the file OS is configured to send a command based on the second write request to the block OS, and the block OS is configured to store write data corresponding to the second write request in the storage device according to the command.

11. The method according to the claim 10:
wherein the first part of the physical resource is exclusively used by the block OS.

12. The method according to the claim 10:
wherein the hypervisor provides more than two virtual devices, and different kinds of OSs, other than for the block OS, are performed on each of the more than two virtual devices.

13. The method according to the claim 10:
wherein the physical resources further include at least one of a port and a part of a memory.

14. The method according to claim 10,
wherein in response to receiving a read request from the file client device, the file OS performs the steps of:
sending the read request to the block OS; and
replying with data sent from the block OS,
wherein the block OS is configured to read the data requested by the read request from the storage device, and send the read data to the file OS.

15. The method according to claim 10, wherein the step of creating the at least one logical partition, by the hypervisor, from the physical resources in the second part of the physical resources is performed during the boot processing.

16. The method according to claim 10,
wherein control information is communicated between the file OS and the block OS via the hypervisor.

17. The method according to claim 10,
wherein, when failure is occurred in the file OS, the failure is notified to the block OS via the hypervisor.

18. A storage system, comprising:
a storage device;
a central processing unit (CPU) as physical resources which are available for use by a block Operating System (OS) for a block type Input/Output (I/O) and by a hypervisor for creating at least one logical partition,
wherein the block OS takes a first part of the physical resources, including at least a first part of the CPU, as physical resources for processing the block type I/O, and, the hypervisor takes a second part of the physical resources, including at least a second part of the CPU and not taken by the block OS, as physical resources for the hypervisor after the first part of the physical resources is taken by the block OS,
wherein the hypervisor creates the at least one logical partition from the physical resources in the second part of the physical resources,
wherein a file OS processes a file type I/O on the at least one logical partition created by the hypervisor,
wherein in response to a first write request sent from a block client device, the block OS is configured to store write data corresponding to the first write request in the storage device without involvement of the hypervisor, and
wherein in response to a second write request sent from the file client device, the file OS is configured to send a command based on the second write request to the block OS, and the block OS is configured to store write data corresponding to the second write request in the storage device according to the command.

* * * * *